US012645846B2

(12) United States Patent
Woo et al.

(10) Patent No.: US 12,645,846 B2
(45) Date of Patent: Jun. 2, 2026

(54) ELECTRONIC DEVICE FOR DISPLAYING SECURITY IMAGE, AND METHOD FOR OPERATING SAME

(71) Applicant: SAMSUNG ELECTRONICS CO., LTD., Suwon-si (KR)

(72) Inventors: Youngchan Woo, Suwon-si (KR); Joohee Park, Suwon-si (KR); Joonhye Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 18/224,777

(22) Filed: Jul. 21, 2023

(65) Prior Publication Data

US 2023/0367915 A1     Nov. 16, 2023

Related U.S. Application Data

(63) Continuation of application No. PCT/KR2021/020158, filed on Dec. 29, 2021.

(30) Foreign Application Priority Data

Feb. 22, 2021     (KR) ........................ 10-2021-0023496

(51) Int. Cl.
*G06F 21/84*          (2013.01)
*G06F 3/0488*        (2022.01)
(Continued)

(52) U.S. Cl.
CPC ............ *G06F 21/84* (2013.01); *G06F 3/0488* (2013.01); *G06F 21/31* (2013.01); *G06V 10/764* (2022.01)

(58) Field of Classification Search
CPC .............................. G06F 21/84; G06F 3/0488
See application file for complete search history.

(56) References Cited

U.S. PATENT DOCUMENTS 9,043,900 B1     5/2015   Kim et al.
9,865,107 B2 *   1/2018   Chang .................... H04L 67/12
(Continued)

FOREIGN PATENT DOCUMENTS

JP          2005-165777 A      6/2005
JP          2007-004383 A      1/2007
(Continued)

OTHER PUBLICATIONS

International Search Report (PCT/ISA/210) issued by the International Searching Authority on Mar. 25, 2022 in corresponding International Application No. PCT/KR2021/020158.
(Continued)

*Primary Examiner* — Viral S Lakhia
(74) *Attorney, Agent, or Firm* — Sughrue Mion, PLLC

(57)                     ABSTRACT

An electronic device includes a display and a processor. The processor receives a display request for images including a first image, identifies one or more objects included in the first image, based on the one or more objects including a security object, determine a replaced image to replace the first image based on the one or more objects included in the first image, and control the display to display the replaced image corresponding to the first image together with one or more other images distinct from the first image, among the images, that does not include a security object.

18 Claims, 35 Drawing Sheets

(51) Int. Cl.
    *G06F 21/31*     (2013.01)
    *G06V 10/764*     (2022.01)

(56)         References Cited

U.S. PATENT DOCUMENTS

| | | | | |
|---|---|---|---|---|
| 9,984,232 | B2 * | 5/2018 | Lee | G06F 21/54 |
| 10,496,809 | B1 * | 12/2019 | Pham | G06N 20/00 |
| 10,679,414 | B2 * | 6/2020 | Jacobson | G06F 3/04842 |
| 10,805,518 | B2 * | 10/2020 | Kang | G06F 21/32 |
| 10,922,394 | B2 * | 2/2021 | Han | G06F 21/32 |
| 11,029,566 | B2 * | 6/2021 | Robinson | G02B 5/0221 |
| 11,030,288 | B2 * | 6/2021 | Yoon | G06F 21/32 |
| 11,232,306 | B2 | 1/2022 | Heo et al. | |
| 11,366,888 | B2 * | 6/2022 | Jeon | G06F 3/048 |
| 11,410,466 | B2 * | 8/2022 | Lee | G06V 40/197 |
| 11,907,345 | B2 * | 2/2024 | Lee | G06V 40/67 |
| 12,062,237 | B2 | 8/2024 | Lee et al. | |
| 2005/0240878 | A1 | 10/2005 | Anthony et al. | |
| 2009/0010570 | A1 * | 1/2009 | Yamada | H04N 19/17 |
| | | | | 382/312 |
| 2010/0190531 | A1 | 7/2010 | Hasegawa | |
| 2012/0054838 | A1 | 3/2012 | Kim et al. | |
| 2012/0074227 | A1 | 3/2012 | Ferren et al. | |
| 2014/0040373 | A1 | 2/2014 | Takamatsu | |
| 2014/0344954 | A1 * | 11/2014 | Kim | H04L 63/105 |
| | | | | 726/28 |
| 2015/0106765 | A1 | 4/2015 | Lee et al. | |
| 2015/0199523 | A1 | 7/2015 | Hamilton et al. | |
| 2015/0356304 | A1 | 12/2015 | You | |
| 2015/0371073 | A1 * | 12/2015 | Cho | G06F 21/32 |
| | | | | 382/124 |

| | | | | |
|---|---|---|---|---|
| 2017/0316250 | A1 | 11/2017 | Roh et al. | |
| 2018/0014198 | A1 * | 1/2018 | Suh | H04N 1/448 |
| 2018/0307855 | A1 * | 10/2018 | Dogu | G06F 16/16 |
| 2022/0164434 | A1 * | 5/2022 | Varada | G06F 21/46 |

FOREIGN PATENT DOCUMENTS

| | | | |
|---|---|---|---|
| JP | 2010-177972 A | 8/2010 |
| JP | 2014-29587 A | 2/2014 |
| KR | 10-2008-0024531 A | 3/2008 |
| KR | 10-2012-0014013 A | 2/2012 |
| KR | 10-2012-0066085 A | 6/2012 |
| KR | 10-2014-0098544 A | 8/2014 |
| KR | 10-2015-0045264 A | 4/2015 |
| KR | 10-2015-0092480 A | 8/2015 |
| KR | 10-2016-0089711 A | 7/2016 |
| KR | 10-2016-0110384 A | 9/2016 |
| KR | 10-2016-0114316 A | 10/2016 |
| KR | 10-2017-0122386 A | 11/2017 |
| KR | 10-1794108 B1 | 11/2017 |
| KR | 10-2019-0049148 A | 5/2019 |
| KR | 10-2020-0063531 A | 6/2020 |
| KR | 10-2020-0101233 A | 8/2020 |
| KR | 10-2020-0124480 A | 11/2020 |

OTHER PUBLICATIONS

Written Opinion (PCT/ISA/237) issued by the International Searching Authority on Mar. 25, 2022 in corresponding International Application No. PCT/KR2021/020158.

Office Action issued Apr. 28, 2026 in Korean Application No. 10-2021-0023496.

* cited by examiner

| Location | Network | Safe zone | States |
|---|---|---|---|
| Inside first area | First network | Inside first safe zone | First state |
| Inside first area | X | Boundary of first safe zone | Second state |
| X | X | X | Third state |

FIG. 10

| Types | Objects | Privacy levels |
|---|---|---|
| People | Three or more | Privacy level 1 |
| People | Selfie or exposure | Privacy level 2 |
| People | Two | Privacy level 3 |
| ID | User's ID | Privacy level 2 |
| ID | Someone else's ID | Privacy level 3 |
| Document | Number of pieces of security information < Threshold | Privacy level 1 |
| Document | Number of pieces of security information ≥ Threshold | Privacy level 2 |
| Document | Someone else's security information | Privacy level 3 |

FIG. 19

START

RECEIVE USER INPUT TO TOGGLE KEY ~ 2501

PERFORM AUTHENTICATION PROCEDURE
BASED ON PRIVACY LEVEL CORRESPONDING
TO ACTIVATION LEVEL OF TOGGLE KEY ~ 2503

DISPLAY IMAGE CORRESPONDING
TO AUTHENTICATED PRIVACY LEVEL ~ 2505

END

ELECTRONIC DEVICE FOR DISPLAYING SECURITY IMAGE, AND METHOD FOR OPERATING SAME

CROSS-REFERENCE TO RELATED APPLICATIONS

This application is a continuation application of International Application No. PCT/KR2021/020158, filed on Dec. 29, 2021, in the Korean Intellectual Property Office, which is based on and claims priority to Korean Patent Application No. 10-2021-0023496, filed on Feb. 22, 2021, the disclosures of each of which being incorporated by reference herein in their entireties.

BACKGROUND

1. Field

The disclosure relates to an electronic device for displaying a security image and a method for operating the same.

2. Description of Related Art

A portable electronic device (e.g., a mobile phone) may have stored thereon a plurality of images and videos. The portable electronic device may have an application that may be executed to display the various images and videos. Among the images and videos, there may be an image and/or video that contains security information that a user of the portable electronic device does not wish to show publicly to other people who may be in the vicinity of the portable electronic device.

SUMMARY

In accordance with an aspect of the disclosure, an electronic device may include a display; and a processor configured to receive a display request for a plurality of images comprising a first image; identify at least one object included in the first image; based on the at least one object comprising at least one security object, determine a replaced image to replace the first image based on the at least one object included in the first image; and control the display to display the replaced image corresponding to the first image together with at least one other image distinct from the first image, among the plurality of images, that does not include a security object.

In accordance with another aspect of the disclosure, an electronic device may include a display; and a processor configured to receive a display request for a plurality of images comprising a first image; identify at least one object included in the first image; based on the at least one object comprising at least one security object, determine a replaced image to replace the first image based on the at least one object included in the first image; identify state information of the electronic device; control the display to display at least one other image distinct from the first image, among the plurality of images, that does not comprise a security object; and based on the state information indicating the electronic device is not in a safe zone state, control the display to display the replaced image corresponding to the first image together with the at least one other image.

In accordance with yet another aspect of the disclosure, a method of operating an electronic device may include identifying a display request for a plurality of images comprising a first image; identifying at least one object included in the first image; based on the at least one object comprising at least one security object, determining a replaced image to replace the first image based on the at least one object included in the first image; and displaying, through a display of the electronic device, the replaced image corresponding to the first image together with the at least one other image distinct from the first image, among the plurality of images, that does not comprises a security object.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which:

FIG. 10 is a diagram illustrating a state of an electronic device according to an embodiment;

FIG. 19 is a diagram illustrating an operation of an electronic device according to an embodiment;

DETAILED DESCRIPTION

When browsing images using, for example, a gallery application executed in a portable electronic device (e.g., a mobile phone), a next image (e.g., a second image) may be displayed according to a user input (e.g., a touch input of swiping a screen from right to left) while a specific image (e.g., a first image) is being displayed on a display of the portable electronic device.

In the case where a user is not aware of information about an image to be displayed next, an image containing security information may be unintentionally displayed. If the user is viewing the corresponding portable electronic device with other people, the user may expose sensitive security information to others.

Therefore, it is advantageous to prevent security content (e.g., an image including security information) stored in the portable electronic device from being displayed on the display of the portable electronic device, regardless of the intention of the user of the portable electronic device.

According to various embodiments, an electronic device may include a display and a processor, wherein the processor may be configured to identify a display request for a plurality of images including a first image, identify at least one object included in the first image, determine, based on the case where the first image includes at least one security object, to display a replaced image determined based on the at least one object included in the first image, determine, based on the case where at least one other image that is distinct from the first image, among the plurality of images, does not include a security object, to display the at least one other image, and control the display to display the replaced image corresponding to the first image together with the at least one other image.

According to various embodiments, a method of operating an electronic device may include identifying a display request for a plurality of images including a first image, identifying at least one object included in the first image, determining, based on the case where the first image includes at least one security object, to display a replaced image determined based on the at least one object included in the first image, determine, based on the case where at least one other image that is distinct from the first image, among the plurality of images, does not include a security object, to display the at least one other image, and displaying the replaced image corresponding to the first image together with the at least one other image through a display of the electronic device.

According to various embodiments, an electronic device for displaying a security image and a method of operating the same may be provided in which it is possible to prevent a user from unintentionally disclosing security information to others by providing a method of displaying a security image on a display of an electronic device.

Figure 1:
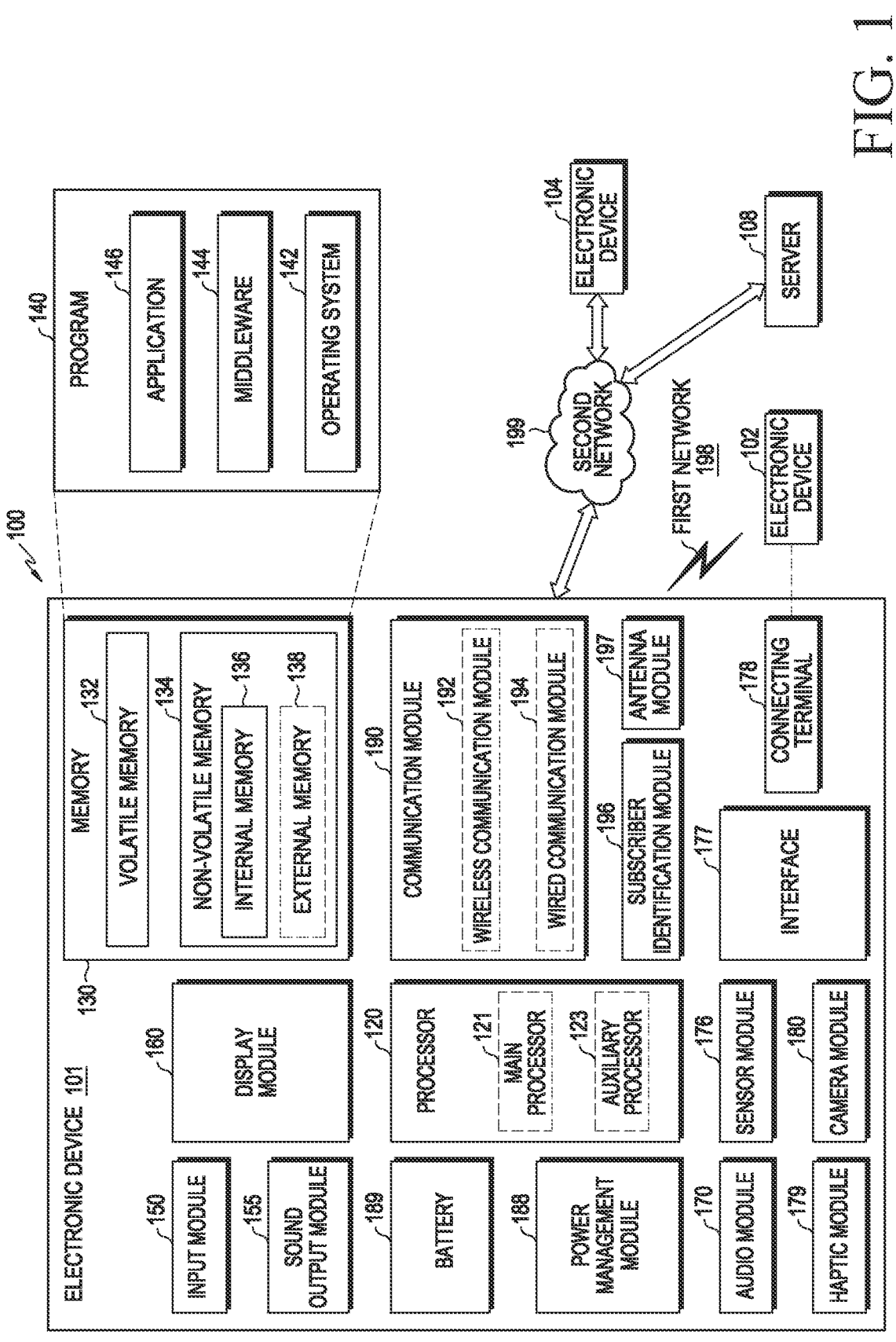
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
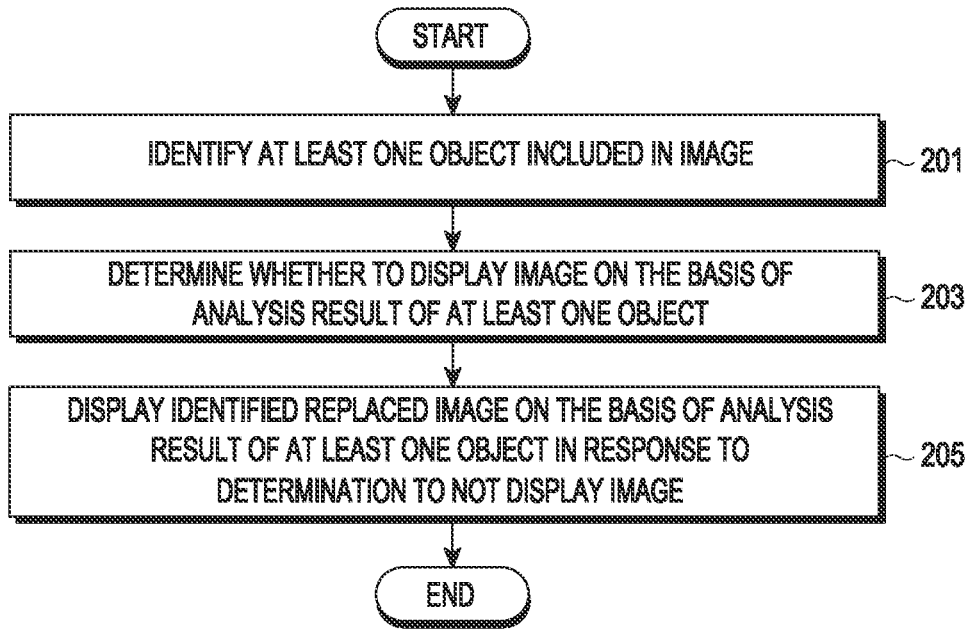
FIG. 2 is a flowchart illustrating a method of operating an electronic device according to an embodiment.
Figure 3A:
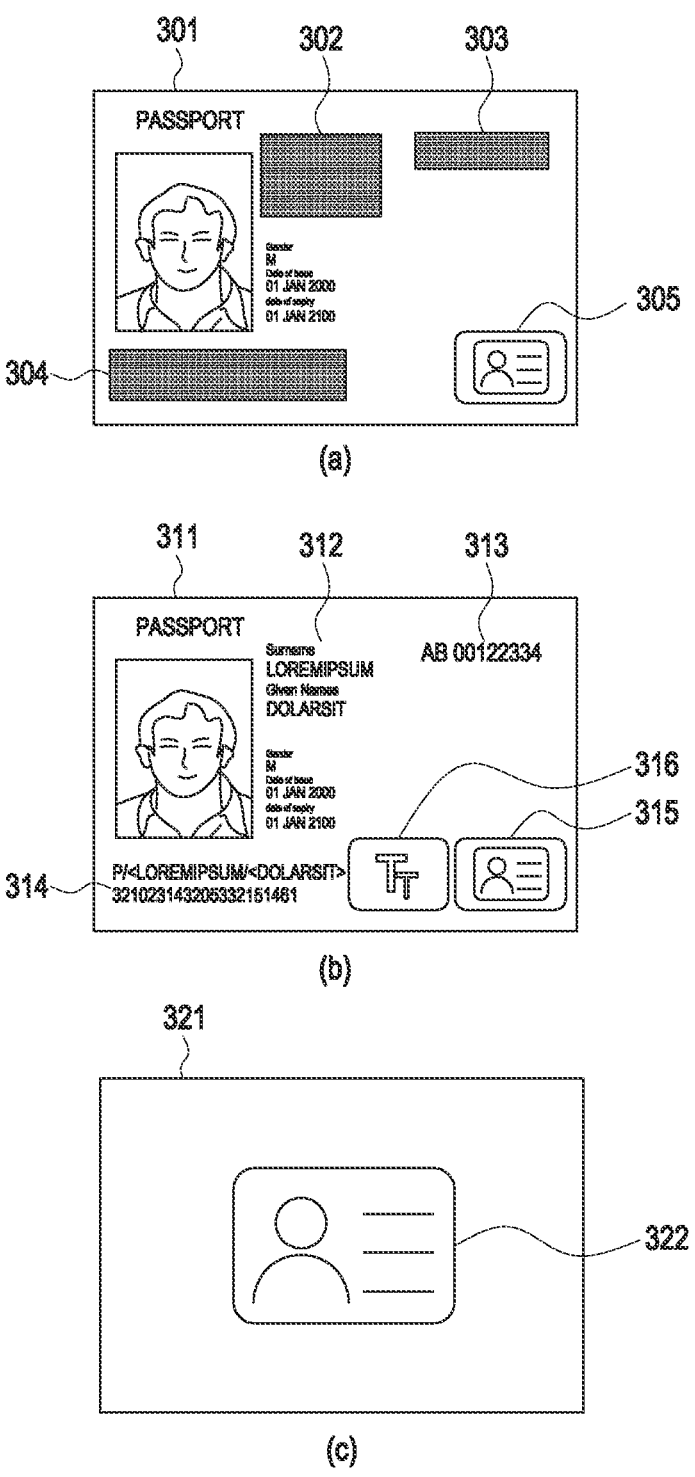
FIG. 3A is a diagram illustrating an operation of an electronic device according to an embodiment.
Figure 3B:
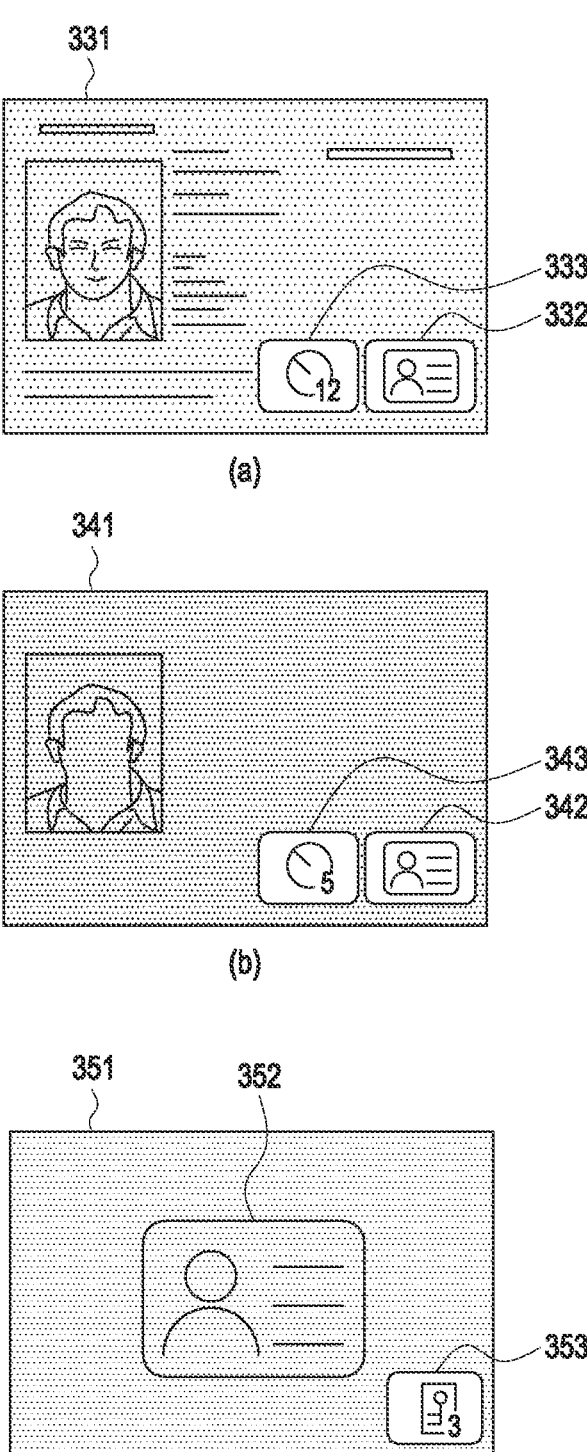
FIG. 3B is a diagram illustrating an operation of an electronic device according to an embodiment.
Figure 4:
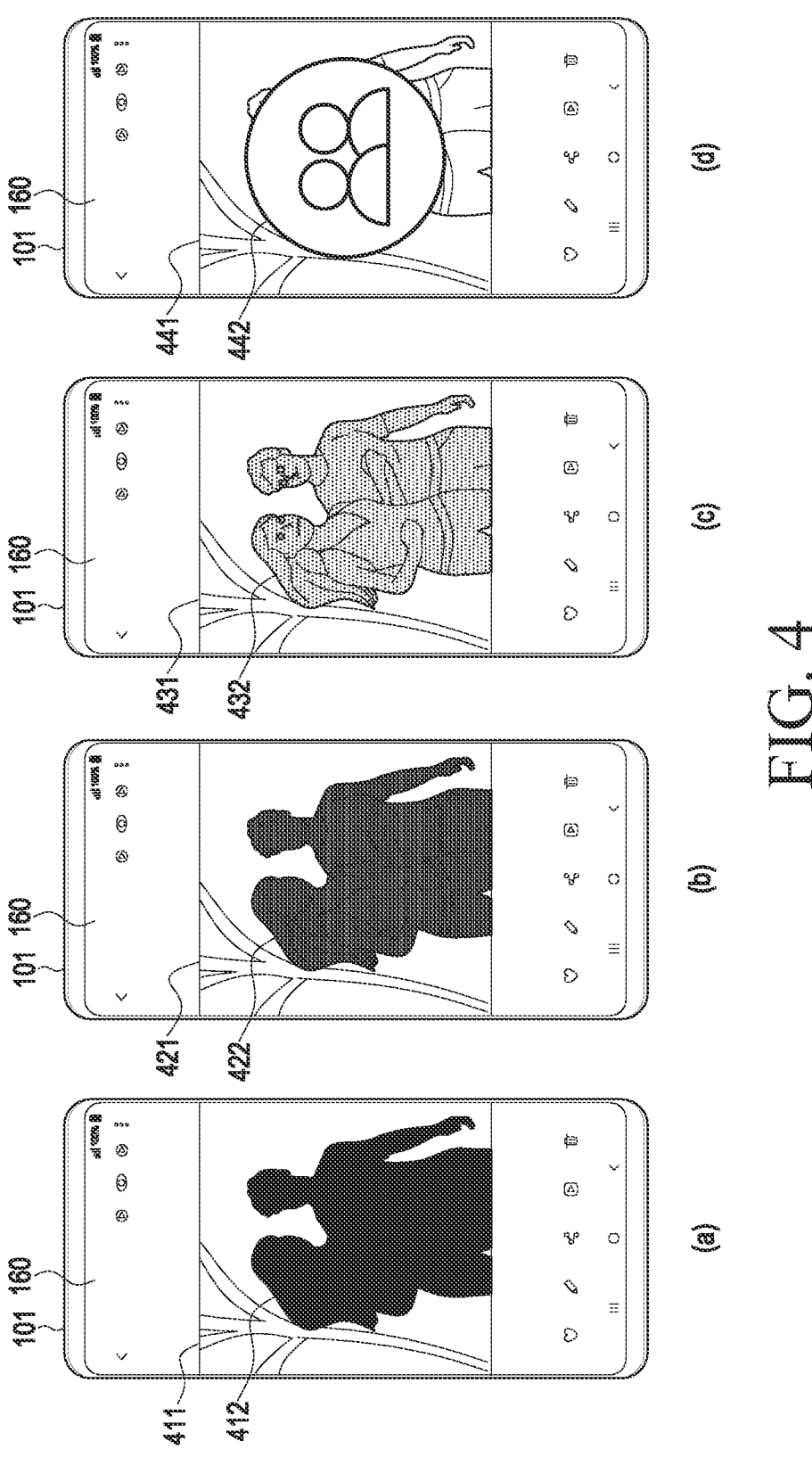
FIG. 4 is a diagram illustrating an operation of an electronic device according to an embodiment.

FIG. 2 is a flowchart illustrating a method of operating an electronic device according to an embodiment. FIG. 2 will be described with reference to FIGS. 3A, 3B, and 4. FIG. 3A is a diagram illustrating an operation of an electronic device according to an embodiment. FIG. 3B is a diagram illustrating an operation of an electronic device according to an embodiment. FIG. 4 is a diagram illustrating an operation of an electronic device according to an embodiment. An electronic device 101 (e.g., a processor 120 of the electronic device 101) may display an image through a display module 160.

Referring to FIG. 2, in operation 201, according to an embodiment, the electronic device 101 (e.g., the processor 120 of the electronic device 101) may identify at least one object included in an image. The electronic device 101 may identify characteristics of at least one object included in the image and determine a type of the image, based on the identified characteristics of the at least one object. For example, the object included in the image may indicate an object representing a face, a body, body posture, sea, a tree, paper, a document, a character string, a resident registration number, a passport number, a flight number, or an account number, but is not specifically limited. The electronic device 101 may store identification models for identifying the above-described various types of objects, and the types of models are not specifically limited. For example, the characteristics of an object may indicate the various types of objects (e.g., a face, a body, a document, and a character string) described above or indicate content of an object (e.g., whether the object is a smiling face or a crying face, whether the object is a person wearing clothes or a person not wearing clothes, whether the object is a contract document or a general document, and/or whether the object is a sequence of meaningful numbers (and/or letters), such as a resident registration number or a passport number, or a sequence of random numbers (and/or letters). For example, the type of image may be a people type, an identification card type, a financial document type, or a landscape type, but is not specifically limited. According to an embodiment, the electronic device 101 may determine characteristics of objects included in the image and determine the number of objects having similar characteristics. For example, the electronic device 101 may identify people included in the image and, based on the fact that there are three objects representing people, identify that the image is a people type image including three people. In some embodiments, for example, the electronic device 101 may identify a combination of numbers included in the image and, based on the identified combination of numbers, identify that a corresponding object represents a mobile phone number. In some embodiments, the electronic device 101 may identify an object representing a mobile phone number and identify that the mobile phone number indicated by the identified object is the mobile phone number of the user of the electronic device 101 or the mobile phone number of someone other than the user of the electronic device 101. In some embodiments, for example, the electronic device 101 may identify that the object included in the image is an object representing paper and identify that another object included in the image is a character string written on the paper. In some embodiments, the electronic device 101 may perform text recognition. At this time, the type of the image may be identified as a financial document, based on the characteristics of the identified character string (e.g., recognition results and/or analysis results). In some embodiments, for example, the electronic device 101 may identify a face and a first character string included in a first image and determine the first image to be an identification card, based on identifying that the first character string is a resident registration number. In some embodiments, the electronic device 101 may identify a face and a second character string included in a second image and determine the second image to be a passport, based on identifying that the second character string is a passport number. For example, the electronic device 101 may determine the first image to be an identification card or determine the second image to be a passport, based on a relative positional relationship between the image and the character string. In some embodiments, the electronic device 101 may determine the first image and/or the second image as an ID type image.

In operation 203, according to an embodiment, the electronic device 101 may determine whether or not to display the image, based on an analysis result of at least one object included in the image. The electronic device 101 may determine whether or not to display the image, based on whether or not the image includes an object subject to security. Determining whether or not to display an image may indicate determining whether or not to display an object subject to security, which is included in the image, or determining whether or not to display an image itself including an object subject to security. For example, the electronic device 101 may identify that the first image is a passport-type image, based on identifying that a character string object included in the first image represents a passport number. In this case, the electronic device 101 may determine whether or not to display the object representing the passport number included in the first image or determine whether or not to display the first image itself including the object representing the passport number.

In operation 205, according to an embodiment, in response to determining not to display the image, the electronic device 101 may display a replaced image identified based on a result of analyzing at least one object included in the image.

Although not illustrated in FIG. 2, referring to FIG. 16 and/or FIG. 23 described later, according to an embodiment, after a replaced image is displayed, the electronic device 101, in response to a display request for the image (e.g., an original image), may stop displaying the replaced image and display the image (e.g., the original image).

Displaying the replaced image will be described with reference to FIGS. 3A and 3B.

According to an embodiment, if the electronic device 101 determines not to display at least one object included in the image (e.g., the first image), the replaced image may be an image in which at least one area corresponding to at least a portion of at least one object included in the image (e.g., the first image) is modulated and in which the remaining areas are not modulated.

For example, referring to (a) and (b) in FIG. 3A, the electronic device 101 may determine not to display at least one object subject to security in a first image of a passport type and display a replaced image 301 or 311 identified based on an analysis result of at least one object included in the first image. For example, the electronic device 101 may identify that a first object is a person's face, that a second object is a person's name, that a third object is a passport number, that a fourth object is a passport issuance date, and that a fifth object is a comprehensive information of a passport holder, among the objects included in the first image. According to an embodiment, referring to (a) in FIG. 3A, the electronic device 101 may display a first area corresponding to the first object representing the person's face as an original image, image-process (e.g., blur or highlight) and display a second area 302 corresponding to the second object representing the person's name, image-process (e.g., blur or highlight) and display a third area 303 corresponding to the third object representing the passport number, display a fourth area corresponding to the fourth object representing the passport issuance date as an original image, and image-process (e.g., blur or highlight) and display a fifth area 304 corresponding to the fifth object representing the comprehensive information of a passport holder in the replaced image 301. In some embodiments, referring to (b) in FIG. 3A, the electronic device 101 may display a first area corresponding to the first object representing the person's face as an original image, display a character string randomly selected or randomly disposed, regardless of the information included in the original image, on the second area 312 corresponding to the second object representing the person's name, display a character string randomly selected or randomly disposed regardless of the information included in the original image on the third area 313 corresponding to the third object representing the passport number, display the fourth area corresponding to the fourth object representing the passport issuance date as an original image, and display a character string randomly selected or randomly disposed, regardless of the information included in the original image, on the fifth area 314 corresponding to the fifth object representing the comprehensive information of a passport holder in the replaced image 311.

According to an embodiment, referring to (a) in FIG. 3A, the electronic device 101 may display an object (e.g., the object 305) representing the type of image together with a replaced image (e.g., the replaced image 301). In some embodiments, the electronic device 101 may display a replaced image (e.g., the replaced image 301) including an object (e.g., the object 305) representing the type of image. For example, referring to (a) in FIG. 3A, the electronic device 101 may display an object 305 representing a passport (or ID card) type image together with the replaced image 301 (or the replaced image 301 including an object 305 representing a passport (or ID card) type image). The object representing the type of image may be selected from among pre-configured images or may be an image specified by a user, but is not specifically limited.

According to an embodiment, referring to (b) in FIG. 3A, the electronic device 101 display an object (e.g., the object 315) representing the type of image and an object (e.g., the object 316) representing a modulation method of a corresponding image together with a replaced image (e.g., the replaced image 311). In some embodiments, the electronic device 101 may display a replaced image (e.g., the replaced image 311) including an object (e.g., the object 315) representing the type of image and an object (e.g., the object 316) representing a modulation method of a corresponding image. For example, in (b) of FIG. 3A, the object 316 representing the modulated method of a corresponding image may be an object representing that at least one object included in the image is modulated using a character string randomly selected or randomly disposed, regardless of information included in the original image.

According to an embodiment, when the electronic device 101 determines not to display an image (e.g., the first image) itself, the replaced image may be an image selected from among the pre-configured images, based on the type of the first image identified according to an analysis result of at least one object included in the first image. For example, the pre-configured image may be an image including an object representing the type of image. In some embodiments, the pre-configured image may be an image previously specified by a user but is not specifically limited.

For example, referring to (c) in FIG. 3A, the electronic device 101 may determine not to display the first image of a passport type itself and, based on the type (e.g., a passport type) of the first image, display a replaced image 321 including an object 322 representing a passport type (or ID type), among the pre-configured images.

According to an embodiment, if the electronic device 101 determines not to display an image (e.g., the first image) itself, the replaced image may be an image in which the entire area of the first image was image-processed (e.g., subjected to blurring or highlighting).

For example, referring to (a) in FIG. 3B, the electronic device 101 may determine not to display the first image of a passport-type itself and display a replaced image 331 in which the entire area of the first image was image-processed (e.g., blur or highlight). In some embodiments, the electronic device 101 may display an object 332 representing the type of image together with the replaced image 331.

According to an embodiment, referring to (a), (b), and (c) in FIG. 3B, the electronic device 101 may display an object (e.g., 333, 343, or 353) representing the number of allowable accesses to an original image corresponding to a displayed replaced image together with a replaced image (e.g., 331, 341, or 351). In some embodiments, the electronic device 101 may display a replaced image (e.g., 331, 341, or 351) including an object (e.g., 333, 343, or 353) representing the number of allowable accesses to an original image corresponding to the displayed replaced image. For example, the electronic device 101 may display an original image corresponding to the replaced image at a user's request. At this time, after displaying an original image corresponding to the displayed replaced image as many times as the object (e.g., 333, 343, or 353) representing the number of allowable accesses to the original image indicates, the electronic device 101 may no longer display the original image despite a user's request.

For example, the number (e.g., 12) included in the object 333 in (a) of FIG. 3B may indicate that the number of allowable accesses to the original image corresponding to the replaced image 331 is 12. In some embodiments, for example, the number (e.g., 5) included in the object 343 in (b) of FIG. 3B may indicate that the number of allowable accesses to the original image corresponding to the replaced image 341 is 5. In some embodiments, for example, the number (e.g., 3) included in the object 353 in (c) of FIG. 3B may indicate that the number of allowable accesses to the original image corresponding to the replaced image 351 is 3.

According to an embodiment, referring to (a) and (b) in FIG. 3B, the electronic device 101, based on the number of allowable accesses to the original image corresponding to the replaced image (e.g., 331 or 341), may determine the degree of image-processing for the entire area of the original image and display a replaced image that is image-processed based on the determined degree of image-processing. The degree of image-processing may indicate the degree to which the original image can be recognized, and for example, in the case of performing blurring during the image-processing, degree of image-processing may indicate that the higher the degree of blurring (e.g., 80% greater than 60%), the more difficult it is to recognize the original image.

For example, in (a) of FIG. 3B, the electronic device 101 may determine the degree of image-processing (e.g., blurring 60%) of the entire area of the original image, based on the number of allowable accesses (e.g., 12) to the original image, and display an image-processed replaced image 331. In some embodiments, for example, in (b) of FIG. 3B, the electronic device 101 may determine the degree of image-processing (e.g., blurring 80%) of the entire area of the original image, based on the number of allowable accesses (e.g., 5) to the original image, and display an image-processed replaced image 341. At this time, as shown in (a) and (b) of FIG. 3B, if the number of allowable accesses to the original image is lower, it may be more difficult to recognize the original image through the displayed replaced image, but this configuration is merely exemplary and is not specifically limited.

Displaying the replaced image will continue to be described with reference to FIG. 4.

According to an embodiment, referring to (a) in FIG. 4, the electronic device 101 (e.g., the processor 120) may display, on the display module 160, a replaced image (e.g., 411) obtained by image-processing (e.g., blurring or highlighting) so as not to recognize the original of an area (e.g., 412) corresponding to at least one object included in an image. For example, referring to (a) in FIG. 4, the electronic device 101 may image-process an area 412 corresponding to people included in the image to display an image-processed replaced image 411 in which the original image of the area 412 corresponding to the people is unrecognizable but in which the contour of the area 412 corresponding to the people is recognizable.

According to an embodiment, referring to (b) and (c) in FIG. 4, the electronic device 101 may display, on the display module 160, a replaced image (e.g., 421 or 431) obtained by image-processing an area (e.g., 422 or 432) corresponding to at least one object included in the image, based on a degree of image-processing. The degree of image-processing may be predetermined. For example, referring to (b) in FIG. 4, the electronic device 101 may image-process the area 422 (e.g., blurring 70%) corresponding to the people included in the image, based on the degree of image-processing, thereby displaying an image-processed replaced image 421 in which the original image of the area 422 corresponding to the people cannot be exactly recognized but in which the contour of the area 422 and the lines or colors included in the area 422 can be recognized. In some embodiments, for example, referring to (c) in FIG. 4, the electronic device 101 may image-process the area 432 (e.g., blur the area 50% and modulate the features of the people included in the area 432) corresponding to the people included in the image, based on the degree of image-processing, thereby displaying an image-processed replaced image 421 in which the original image of the area 432 corresponding to the people cannot be accurately recognized but in which the contour of the area 432 and most of the appearances of the people included in the area 432, excluding the features thereof, can be recognized. The degree of image-processing is merely exemplary, and the degree of image-processing is not limited.

According to an embodiment, referring to (d) in FIG. 4, the electronic device 101 may display, through the display module 160, a replaced image (e.g., 441) including an object (e.g., 442) representing the type of image on an area corresponding to at least one object included in the image. For example, referring to (d) in FIG. 4, the electronic device 101 may identify objects representing people included in the image, determine the type of image to be a people type including two people, based on the fact that the number of objects representing the people is 2, and display an object 442 representing the type of image on an area corresponding to the object representing the people, thereby displaying a replaced image 441 in which the original of the area where the object 442 representing the type of image is displayed is unrecognizable nut in which the original of the remaining area, excluding the area where the object 442 representing the type of image is displayed, is recognizable.

As described above, displaying a replaced image may indicate displaying the replaced image by replacing the original image.

In some embodiments, displaying a replaced image may indicate displaying the original image and a modulation layer so as to overlap each other, and thus displaying a replaced image may be understood as displaying the original image and the modulation layer so as to overlap each other. Displaying the original image and the modulation layer to overlap each other will be described in detail with reference to FIG. 5. The modulation layer may include a modulation object. Therefore, in FIG. 5, a description of the modulation layer may be understood as a description of the modulation object. For example, producing a modulation layer may be understood as producing a modulation object. In some embodiments, displaying a modulation layer may be understood as displaying a modulation object. In some embodiments, displaying the modulation layer to overlap the original image may indicate displaying the modulation object to overlap the original image. In some embodiments, a modulation object may be produced, regardless of the modulation layer, and the modulation object may be displayed to overlap the original image.

Figure 5:
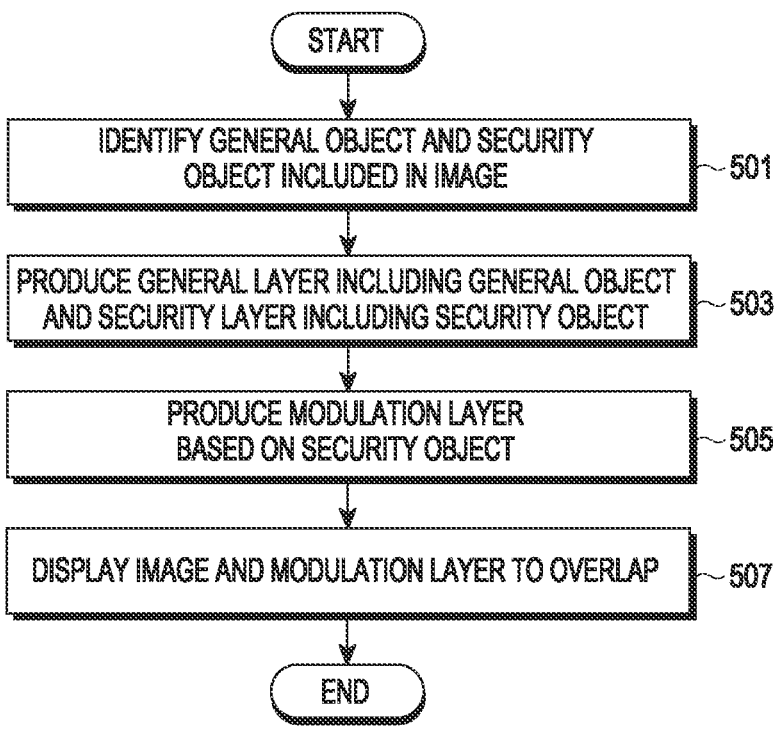
FIG. 5 is a flowchart illustrating a method of operating an electronic device according to an embodiment.

FIG. 5 is a flowchart illustrating a method of operating an electronic device according to an embodiment. FIG. 5 will be described with reference to FIG. 4.

Referring to FIG. 5, in operation 501, according to an embodiment, the electronic device 101 (e.g., the processor 120 of the electronic device 101) may identify a general object and a security object included in an image. The general object may be an object that does not include security information, and the security object may be an object that includes security information. For example, the electronic device 101 may identify a landscape and people included in a people image, and may identify the identified landscape as a general object and identify the identified people as a security object. For example, the electronic device 101 may identify a general character string and a security character string (e.g., a name and an account number) included in a document image, and may identify the identified general character string as a general object and identify the identified security character string as a security object. For example, the electronic device 101 may identify a person and a resident registration number included in an ID image, and may identify the identified person as a general object and identify the identified resident registration number as a security object. The general objects and security objects are only examples and are not specifically limited.

In operation 503, according to an embodiment, the electronic device 101 may identify at least one object included in the image and produce at least one security layer including at least one security object and at least one general layer including at least one general object. The electronic device 101 may produce respective layers including one object or respective layers including a plurality of objects. For example, the electronic device 101 may produce a security layer including a security object representing people included in a people image and produce a general layer including at least one remaining object, excluding the security object representing the people included in the people image. In some embodiments, for example, the electronic device 101 may produce a first security layer including an object representing a resident registration number included in an ID card image, produce a second security layer including an object representing an address included in the ID card image, and produce a general layer including at least one remaining object, excluding the object representing the resident registration number and the object representing the address included in the ID image. In some embodiments, the electronic device 101 may produce a security layer including an object representing a resident registration number and an object representing an address included in the ID image. The electronic device 101 may store the produced at least one security layer and/or at least one general layer as respective files for each layer, and may temporarily produce at least one security layer and/or at least one general layer and temporarily store the same in a buffer by a specific request and then, when the process according to the specific request is completed, delete the at least one produced security layer and/or the at least one produced general layer. The method of producing, storing, or deleting the layers is not limited to a specific method.

In operation 505, according to an embodiment, the electronic device 101 may produce a modulation layer, based on at least one security object included in the image. The electronic device 101, based on respective security objects included in the image, may produce a plurality of modulation layers corresponding to the respective security objects or, based on at least one security object included in the image, may produce one modulation layer.

For example, referring to (a), (b), and (c) in FIG. 4, the electronic device 101 may identify objects representing people included in the image, identify that the number of objects representing the people is 2, and produce one modulation layer to modulate an area corresponding to objects representing people. For example, the electronic device 101 may identify a first area corresponding to a first object representing a first person and a second area corresponding to a second object representing a second person from an image including two people, and produce a modulation layer corresponding to a security area including the identified first area and second area. For example, the modulation layer may indicate a layer for image-processing an area corresponding to the security object, based on a degree of image-processing. The degree of image-processing may be predetermined. In some embodiments, for example, the modulation layer may indicate a layer produced by image-processing an area corresponding to the security object, based on the degree of image-processing. For example, referring to (a) in FIG. 4, the modulation layer may indicate a layer produced by bluffing an area 412 corresponding to the security object such that the original of the area 412 is unrecognizable. In some embodiments, for example, referring to (b) in FIG. 4, the modulation layer may indicate a layer produced by performing image-processing (e.g., bluffing 70%) an area 422 corresponding to the security object such that the original image of the area 422 cannot be exactly recognized but such that the contour of the area 422 and the lines or colors included in the area 422 can be recognized. In some embodiments, for example, referring to (c) in FIG. 4, the modulation layer may indicate a layer produced by performing image-processing (e.g., bluffing 50%) an area 432 corresponding to the security object such that the original image of the area 432 cannot be exactly recognized but such that the contour of the area 432 and most of the appearances of the people included in the area 432, excluding the features thereof, can be recognized. For example, the modulation layer may include information about an area that is a target to be image-processed (e.g., the position and degree of image-processing of the target area) but may not include information about the remaining areas, excluding the area that is a target to be image-processed.

In some embodiments, for example, referring to (a) and (b) in FIG. 3A, the electronic device 101 may identify a plurality of security objects representing a name, a passport number, and comprehensive information of a passport holder included in a passport image, and produce a plurality of modulation layers for modulating areas corresponding to the respective security objects. For example, the modulation layer may indicate a layer for image-processing an area corresponding to the security object, based on an image-processing method. The image-processing method may be predetermined. In some embodiments, for example, the modulation layer may indicate a layer produced by image-processing an area corresponding to the security object, based on an image-processing method. The image-processing method may be predetermined. For example, referring to (a) in FIG. 3A, the electronic device 101 may produce a first modulation layer by performing blurring on an area 302 corresponding to an object representing the name such that the original of the area 302 is unrecognizable, produce a second modulation layer by performing blurring on an area 303 corresponding to an object representing the passport number such that the original of the area 303 is unrecognizable, and produce a third modulation layer by performing blurring on an area 304 corresponding to an object representing the comprehensive information of a passport holder such that the original of the area 304 is unrecognizable. In some embodiments, for example, referring to (b) in FIG. 3A, the electronic device 101 may produce a first modulation layer in which a character string randomly selected or randomly disposed, regardless of information included in the original image, is displayed on an area 312 corresponding to an object representing the name, produce a second modulation layer in which a character string randomly selected or randomly disposed, regardless of information included in the original image, is displayed on an area 313 corresponding to an object representing the passport number, and produce a third modulation layer in which a character string randomly selected or randomly disposed, regardless of information included in the original image, is displayed on an area 314 corresponding to an object representing the comprehensive information of a passport holder. Like the general layer and the security layer, producing, storing, or deleting the modulation layer is not limited to a specific method In operation 507, according to an embodiment, the electronic device 101 may control the display module 160 to display an image and at least one modulation layer corresponding to the image so as to overlap each other. For example, referring to (a) in FIG. 4, the electronic device 101 may display an original image including two people and a modulation layer for blurring an area 412 corresponding to two people so as to overlap each other. In some embodiments, for example, referring to (a) in FIG. 3A, the electronic device 101 may display an original image including a passport and a plurality of modulation layers (e.g., a first modulation layer for blurring the first area 302 corresponding to the name, a second modulation layer for blurring the second area 303 corresponding to the passport number, and a third modulation layer for bluffing the third area 304 corresponding to the comprehensive information of a passport holder) so as to overlap each other.

Figure 6:
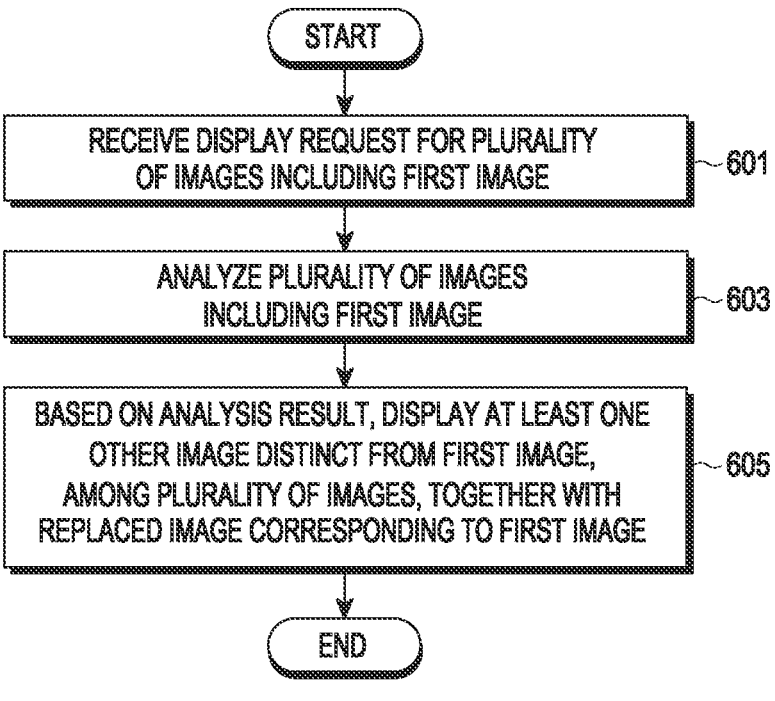
FIG. 6 is a flowchart illustrating a method of operating an electronic device according to an embodiment.
Figure 8:
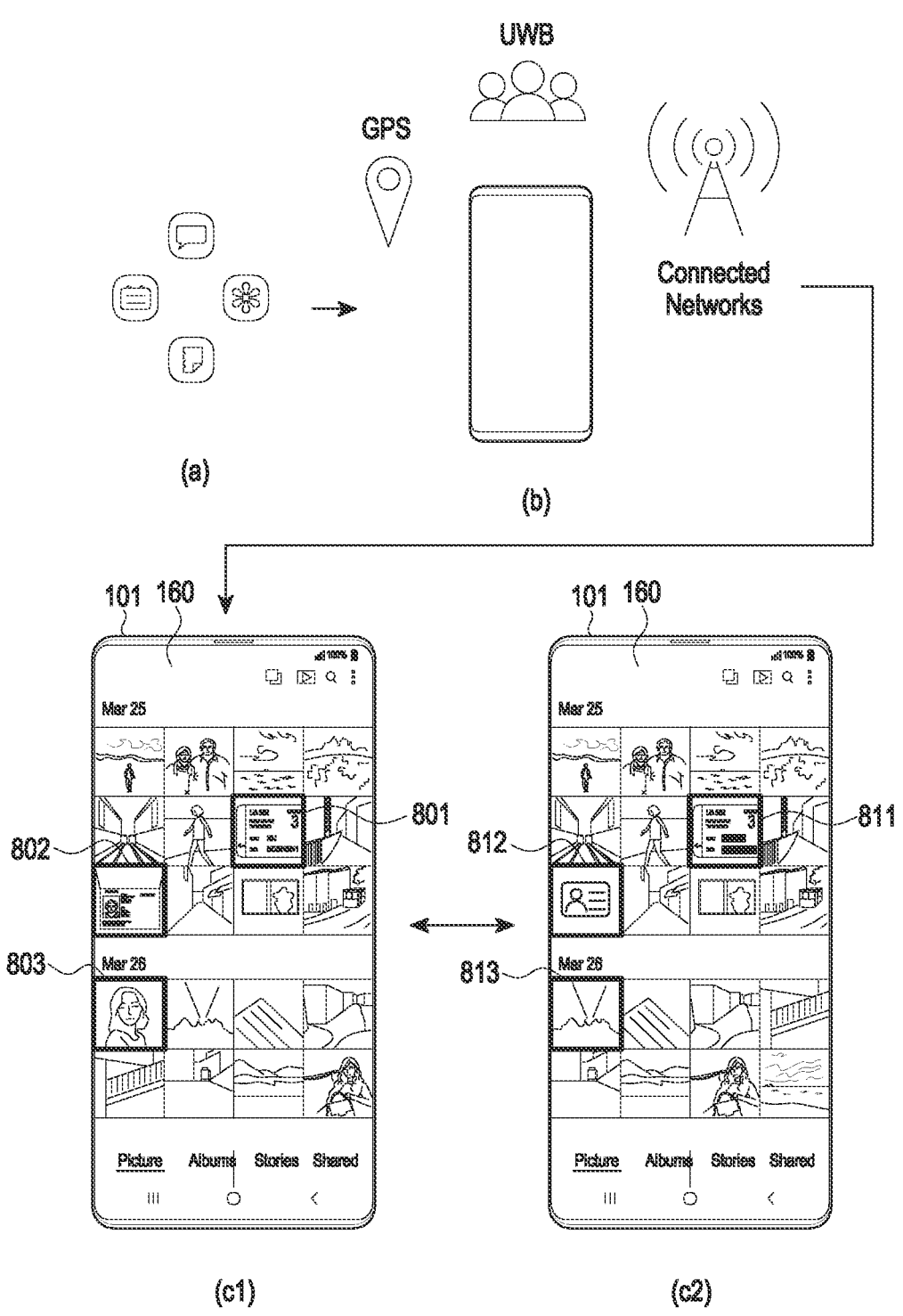
FIG. 8 is a diagram illustrating an operation of an electronic device according to an embodiment.

FIG. 6 is a flowchart illustrating a method of operating an electronic device according to an embodiment. FIG. 6 will be described with reference to FIG. 8. FIG. 8 is a diagram illustrating the operation of an electronic device according to an embodiment.

Referring to FIG. 6, in operation 601, according to an embodiment, the electronic device 101 (e.g., the processor 120 of the electronic device 101) may receive a display request for a plurality of images including a first image. For example, the electronic device 101 may receive a request for executing a gallery application and receive a display request for at least one image related to the gallery application.

In operation 603, according to an embodiment, the electronic device 101 may analyze the plurality of images including the first image. For example, the electronic device 101 may determine that the first image is to be displayed using a replaced image, based on an analysis result of at least one object included in the first image, and that at least one image distinct from the first image is to be displayed using an original image, based on an analysis result of at least one object included in at least one image. For example, the electronic device 101 may determine that a replaced image determined based on at least one object included in the first image is to be displayed based on the fact that the first image includes at least one security object and that at least one other image is to be displayed using an original image, based on the fact that at least one other image distinct from the first image does not include a security object.

In operation 605, according to an embodiment, the electronic device 101, based on the analysis result of the plurality of images, may control the display module 160 to display at least one other image distinct from the first image, which is determined to be displayed using the original image, among the plurality of images, together with the replaced image corresponding to the first image. For example, referring to (c2) in FIG. 8, the electronic device 101 may display together a first replaced image 811 corresponding to the first image, a second replaced image 812 corresponding to the second image, and at least one other image (e.g., 813) determined to be displayed using the original image, which is distinguished from the first image and the second image.

Figure 7:
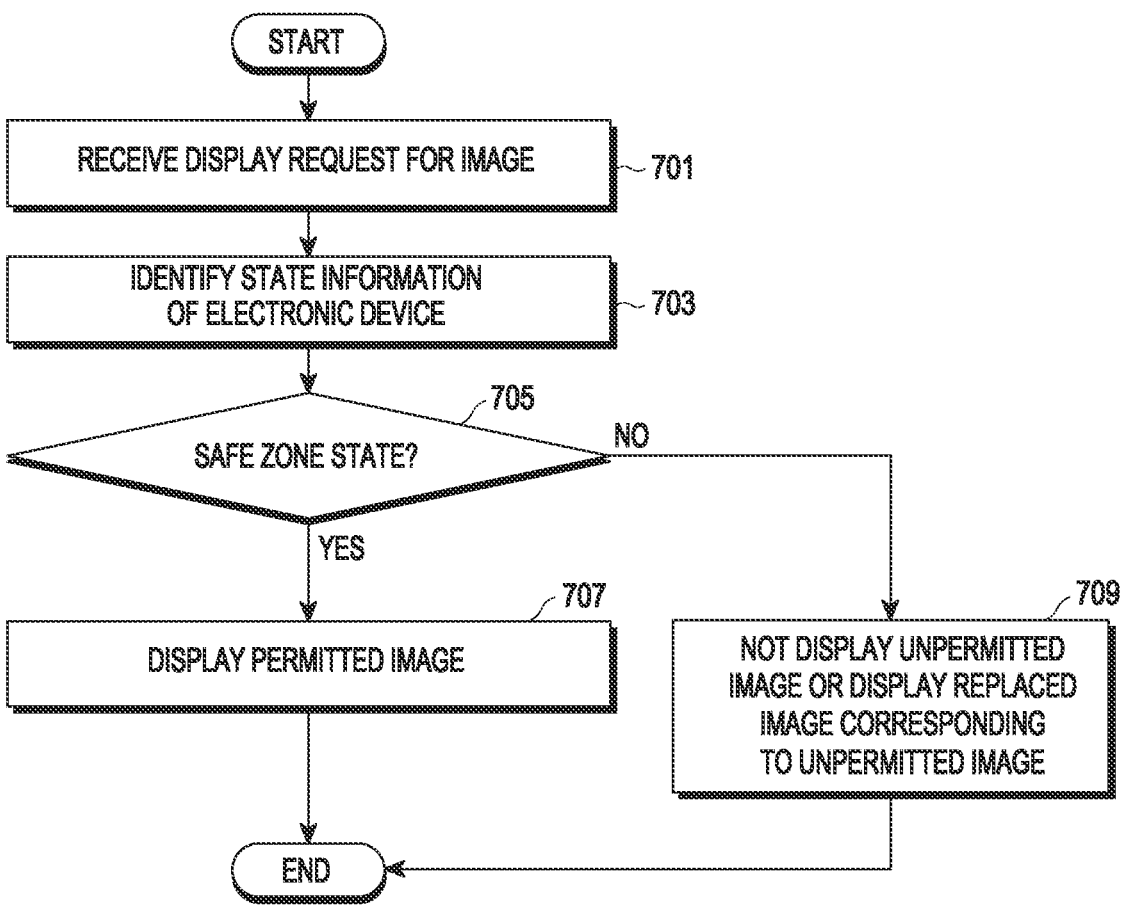
FIG. 7 is a flowchart illustrating a method of operating an electronic device according to an embodiment.

FIG. 7 is a flowchart illustrating a method of operating an electronic device according to an embodiment. FIG. 7 will be described with reference to FIG. 8. FIG. 8 is a diagram illustrating the operation of an electronic device according to an embodiment.

Referring to FIG. 7, in operation 701, according to an embodiment, the electronic device 101 (e.g., the processor 120 of the electronic device 101) may receive a display request for an image. For example, the electronic device 101 may receive a display request for at least one image related to a specific application (e.g., a gallery application, a text application, a calendar application, or a memo application) by receiving a request for executing the specific application.

In operation 703, according to an embodiment, the electronic device 101 may identify state information of the electronic device 101. For example, the electronic device 101 may identify state information of the electronic device 101 including location information of the electronic device 101 using the communication module 190 (e.g., a global navigation satellite system (GNSS) communication module or a global positioning system (GPS) communication module). In some embodiments, for example, the electronic device 101 may identify state information of the electronic device 101 including information about external devices around the electronic device 101 using the communication module 190 (e.g., an ultra-wideband (UWB) communication module or a Bluetooth communication module). In some embodiments, for example, the electronic device 101 may identify state information of the electronic device 101 including information about a network (e.g., the first network 198 or the second network 199) to which the electronic device 101 is currently connected using the communication module 190 (e.g., a Bluetooth communication module, a wireless fidelity (WiFi) communication module, a wireless fidelity (WiFi) direct communication module, a legacy cellular communication module, or a 5G communication module). The state information of the electronic device 101 is merely exemplary and is not limited to a specific type of state information.

In operation 705, according to an embodiment, the electronic device 101 may identify a safe zone state. For example, the electronic device 101 may identify that the electronic device 101 is located in the safe zone or that the electronic device 100 is in a safe zone state. For example, the safe zone state may indicate a state in which the electronic device 101 is located in a specified place. In some embodiments, for example, the safe zone may indicate a state in which the electronic device 101 is able to perform communication through a specified network or a state in which the electronic device 101 is performing communication through a specified network. In some embodiments, for example, the safe zone may indicate a state in which the electronic device 101 is able to sense a specified device located therearound or a state in which the electronic device 101 is able to communicate with a specified device. The electronic device 101 may perform operation 707, based on identifying the safe zone state (705, YES), and perform operation 709, based on identifying a non-safe zone state (705, NO).

In operation 707, according to an embodiment, the electronic device 101 may display a permitted image. For example, the electronic device 101 may display an image allowed in the safe zone state, based on identifying the safe zone state. Images may be divided into general images and security images. The security image may indicate an image in which an original image thereof is permitted to be displayed in a safe zone state but in which the original image is not permitted to be displayed in a non-safe zone state. The general image may indicate an image in which an original image thereof is always permitted to be displayed regardless of the safe zone state. For example, based on the identification of the safe zone state, the electronic device 101 may display an image (e.g., at least one general image and at least one security image whose original image is permitted to be displayed in the safe zone state) allowed in the safe zone state. For example, referring to (c1) in FIG. 8, the electronic device 101, based on identifying the safe zone state, may display at least one general image and at least one security image (e.g., a first security image 801, a second security image 802, and/or a third security image 803) whose original image is permitted to be displayed in the safe zone state.

In operation 709, according to an embodiment, based on identifying that the electronic device 101 is not in the safe zone state, the electronic device 101 may not display an unpermitted image (e.g., a security image) or may display a replaced image corresponding to an unpermitted image (e.g., a security image). For example, based on identifying that the electronic device 101 is not in the safe zone state, the electronic device 101 may display at least one general image and may not display an unpermitted image (e.g., a security image) or display a replaced image corresponding to an unpermitted image (e.g., a security image). For example, referring to (c2) in FIG. 8, the electronic device 101, based on identification of a non-safe zone state, may display at least one general image and replaced images (e.g., a first replaced image 811 corresponding to a first security image 801 and a second replaced image 812 corresponding to a second security image 802) corresponding to unpermitted images (e.g., the first security image 801 and the second security image 802). For example, referring to (c2) in FIG. 8, based on identifying that the electronic device 101 is not in the safe zone state, the electronic device 101 may not display a replaced image corresponding to a third security image 803 and display a next general image 813 at the position where the third security image 803 would be displayed if the electronic device 101 were in the safe zone state.

Figure 9:
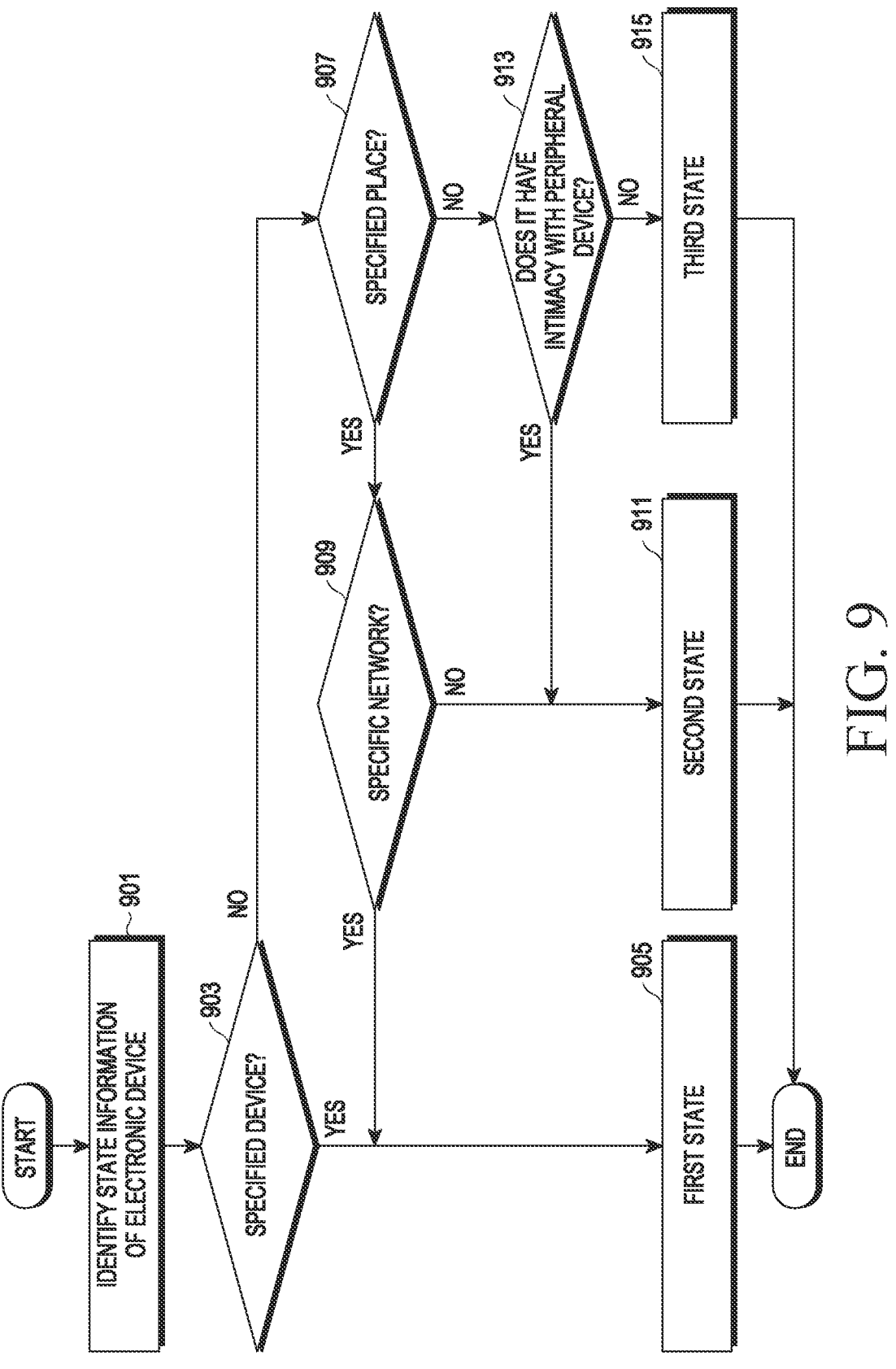
FIG. 9 is a flowchart illustrating a method of operating an electronic device according to an embodiment.
Figure 11:
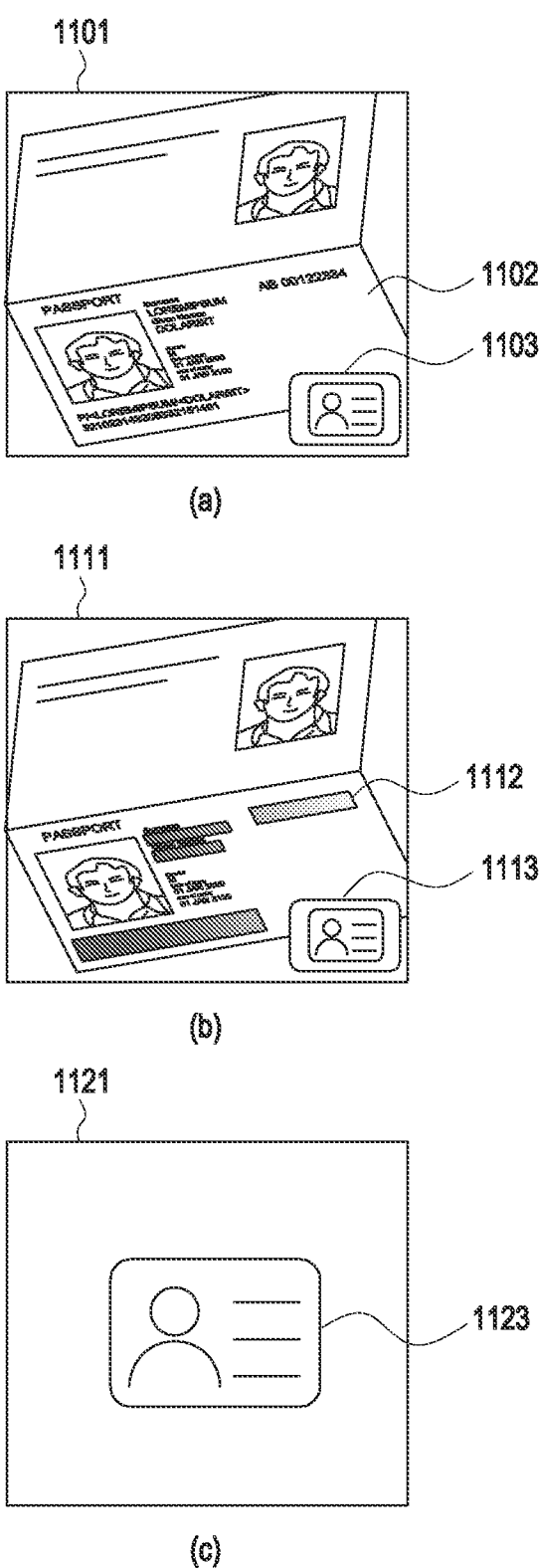
FIG. 11 is a diagram illustrating an operation of an electronic device according to an embodiment.

FIG. 9 is a flowchart illustrating a method of operating an electronic device according to an embodiment. FIG. 9 will be described with reference to FIGS. 10 and 11. FIG. 10 is a diagram illustrating the state of an electronic device according to an embodiment. FIG. 11 is a diagram illustrating an operation of an electronic device according to an embodiment.

Referring to FIG. 9, in operation 901, according to an embodiment, the electronic device 101 (e.g., the processor 120 of the electronic device 101) may identify state information of the electronic device 101.

In operation 903, according to an embodiment, the electronic device 101 may identify whether or not the electronic device 101 is in the state capable of sensing a specified device located therearound or whether or not the electronic device 101 is in the state capable of communicating with a specified device using the communication module 190. In operation 905, the electronic device 101 may determine that the electronic device 101 is in a first state, based on identifying that the electronic device 101 is in the state capable of sensing a specified device located therearound or that the electronic device 101 is in the state capable of communicating with a specified device (905, YES). The electronic device 101 may perform operation 907, based on identifying that the electronic device 101 is not in the state capable of sensing a specified device located therearound or that the electronic device 101 is not in the state capable of communicating with a specified device (903, NO).

In operation 907, according to an embodiment, the electronic device 101 may identify whether or not the electronic device 101 is located in a specified place using the communication module 190. The electronic device 101 may perform operation 909, based on identifying that the electronic device 101 is located at a specified place (907, YES), and perform operation 913, based on identifying that the electronic device 101 is not located at a specified place (907, NO).

In operation 909, according to an embodiment, the electronic device 101 may identify whether or not the electronic device 101 is in the state capable of performing communication through a specified network or whether or not the electronic device 101 is in the state of performing communication through a specified network using the communication module 190. Based on identifying that the electronic device 101 is in the state capable of performing communication through a specified network or that the electronic device 101 is in the state of performing communication through a specified network (909, YES), the electronic device 101 may determine that the electronic device 101 is in a first state in operation 905. Based on identifying that the electronic device 101 is not in the state capable of performing communication through a specified network or that the electronic device 101 is not in the state of performing communication through a specified network (909, NO), the electronic device 101 may determine that electronic device 101 is in a second state in operation 911.

In operation 913, according to an embodiment, the electronic device 101 may determine whether the electronic device 101 has intimacy with a peripheral device sensed by the electronic device 101 using the communication module 190 or with a peripheral device with which the electronic device 101 communicates using the communication module 190. For example, the electronic device 101 may determine whether or not the peripheral device is registered in the contact list of the electronic device 101, whether or not communication or a phone connection between the peripheral device and the electronic device 101 is periodically performed, or whether or not the peripheral device and the electronic device 101 are registered in the same network, thereby determining intimacy with the peripheral device. The electronic device 101, based on determining that the electronic device 101 has intimacy with the peripheral device (913, YES), may determine that the electronic device 101 is in a second state in operation 911 and, based on determining that the electronic device 101 does not have intimacy with the peripheral device (913, NO), determine that the electronic device 101 is in a third state in operation 915. The criteria for determining intimacy with a peripheral device are merely exemplary, and are not specifically limited.

Referring to FIG. 10, for example, based on identifying that the electronic device 101 is located within a predetermined first area and is connected to a predetermined first network, the electronic device 101 may determine that the device 101 is located inside a first safe zone and that the electronic device 101 is in a first state. In some embodiments, for example, based on identifying that the electronic device 101 is located within a predetermined first area and is not connected to a predetermined first network, the electronic device 101 may determine that the device 101 is located at the boundary of a first safe zone and that the electronic device 101 is in a second state. In some embodiments, for example, based on identifying that the electronic device 101 is not located within a predetermined first area or that the electronic device 101 is not located within a predetermined first area and is not connected to a predetermined first network, the electronic device 101 may determine that the electronic device 101 is not in a safe zone state and that the electronic device 101 is in a third state. The criteria for determining the state of the electronic device 101 are merely exemplary and are not specifically limited.

For example, referring to (a) in FIG. 11, the electronic device 101 may identify that the electronic device 101 is in the state capable of displaying an original image of the security image, based on the case where the electronic device 101 is in the first state described as an example in FIGS. 9 and 10, thereby displaying the original image (e.g., 1101) of the security image. For example, the original image 1101 of the security image (e.g., a passport image) may be an image including a security object 1102 (e.g., a name, a passport number, and comprehensive information of a passport holder), and the electronic device 101 may display the original image 1101 of the security image such that the user may recognize the security object 1102. The electronic device 101 may display the original image 1101 of the security image together with an object 1103 corresponding to the type of security image. In some embodiments, for example, referring to (b) in FIG. 11, the electronic device 101 may identify that the electronic device 101 is in the state incapable of displaying an original image of the security image, based on the case where the electronic device 101 is in the second state described as an example in FIGS. 9 and 10, thereby displaying a replaced image (e.g., 1111) corresponding to the security image. For example, based on the second state, the electronic device 101 may display a replaced image 1111 in which the original of an area 1112 corresponding to the security object cannot be identified. The electronic device 101 may display the replaced image 1111 corresponding to the security image together with an object 1113 corresponding to the type of security image. In some embodiments, for example, referring to (c) in FIG. 11, the electronic device 101 may identify that the electronic device 101 is in the state incapable of displaying an original image of the security image, based on the case where the electronic device 101 is in the third state described as an example in FIGS. 9 and 10, thereby displaying a replaced image (e.g., 1121) corresponding to the security image. For example, based on the third state, the electronic device 101 may display a replaced image 1121 including an object 1123 corresponding to the type of security image.

Figure 12:
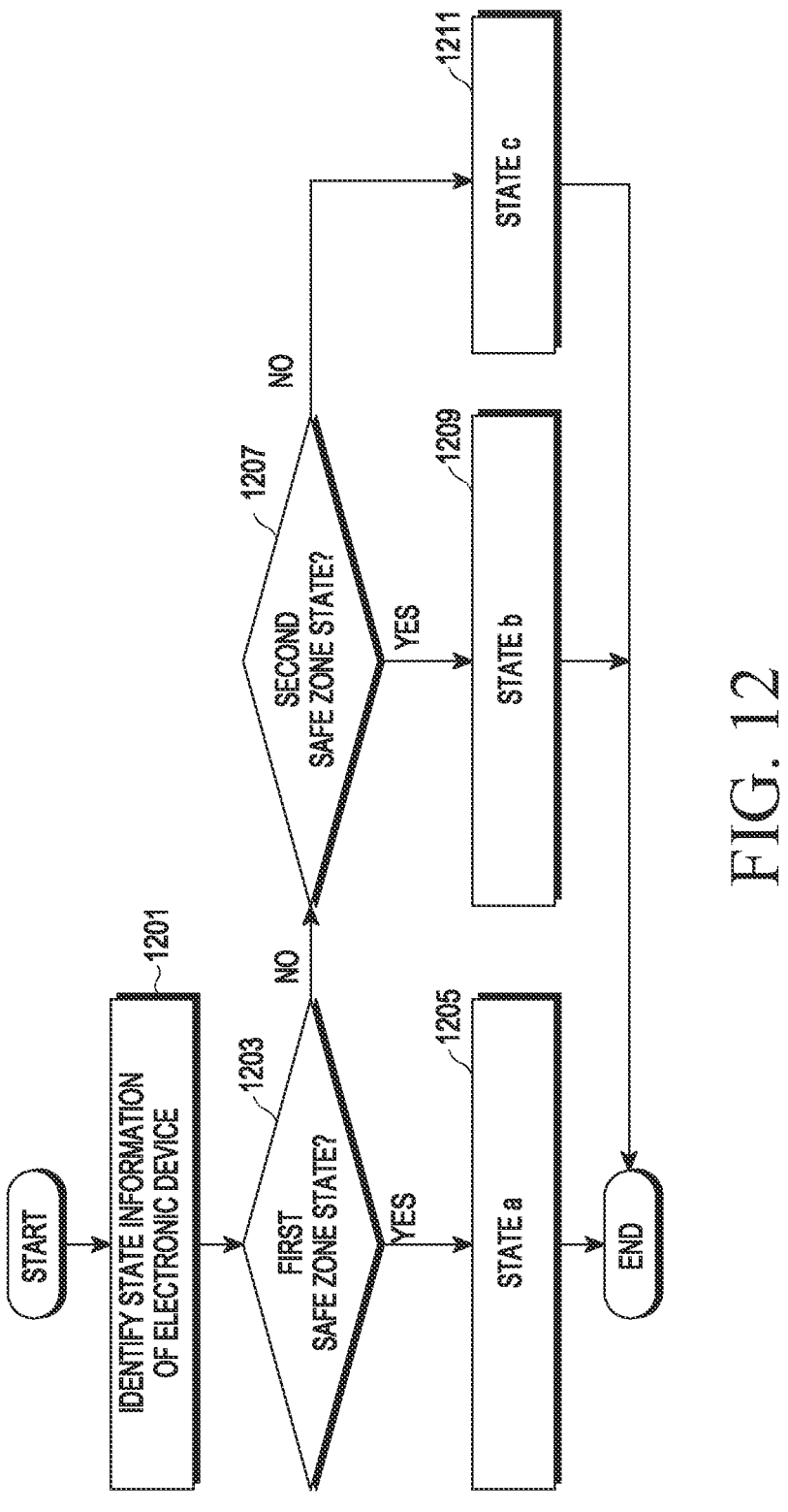
FIG. 12 is a flowchart illustrating a method of operating an electronic device according to an embodiment.
Figure 13:
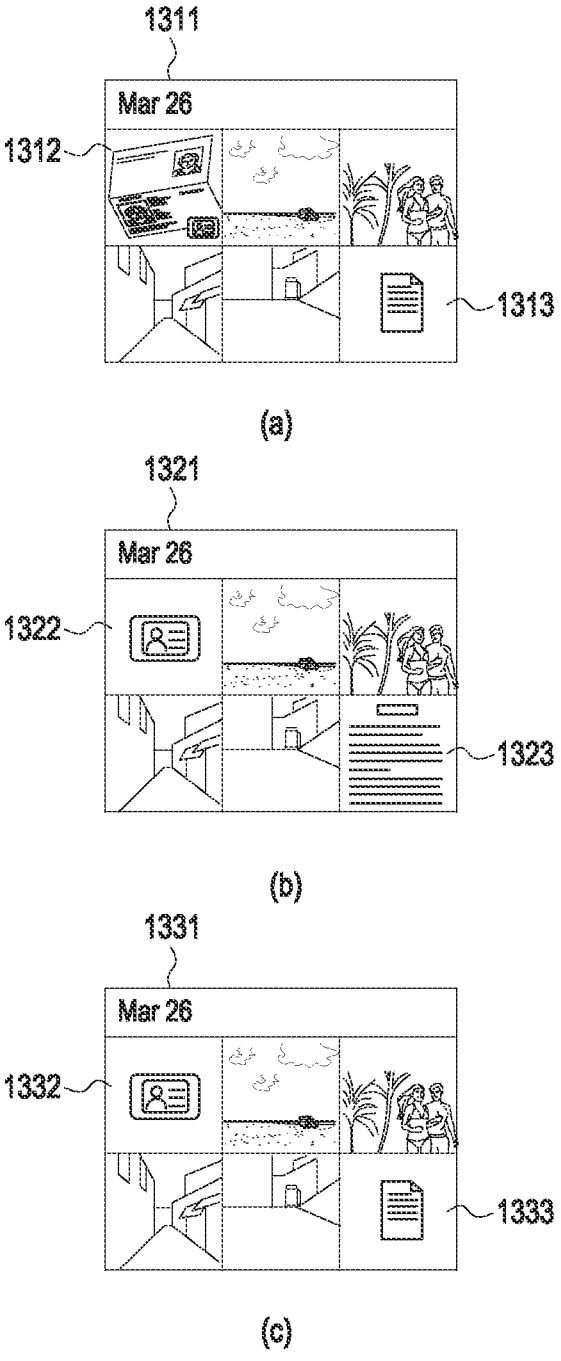
FIG. 13 is a diagram illustrating an operation of an electronic device according to an embodiment.

FIG. 12 is a flowchart illustrating a method of operating an electronic device according to an embodiment. FIG. 12 will be described with reference to FIG. 13. FIG. 13 is a diagram illustrating an operation of an electronic device according to an embodiment.

Referring to FIG. 12, in operation 1201, according to an embodiment, the electronic device 101 (e.g., the processor 120 of the electronic device 101) may identify state information of the electronic device 101.

In operation 1203, according to an embodiment, the electronic device 101 may identify whether or not the electronic device 101 is in a first safe zone state. For example, the electronic device 101 may identify the first safe zone state, based on the case where the electronic device 101 is located in a place that is previously configured as a first place (e.g., home) by the user. The electronic device 101 may determine that the electronic device 101 is in a state "a" in operation 1205, based on identifying that the electronic device 101 is in the first safe zone state (1203, YES). The electronic device 101 may perform operation 1207, based on identifying that the electronic device 101 is not in the first safe zone state (1203, NO).

In operation 1207, according to an embodiment, the electronic device 101 may identify whether or not the electronic device 101 is in a second safe zone state. For example, the electronic device 101 may identify the second safe zone state, based on the case where the electronic device 101 is located in a place that is previously configured as a second place (e.g., office) by the user. The electronic device 101 may determine that the electronic device 101 is in a state "b" in operation 1209, based on identifying that the electronic device 101 is in the second safe zone state (1207, YES). The electronic device 101 may determine that the electronic device is in a state "c" in operation 1211, based on identifying that the electronic device 101 is not in the second safe zone state (1207, NO).

Referring to FIG. 13, for example, in (a) in FIG. 13, the electronic device 101, based on the case where the electronic device 101 is in the state "a" described as an example in FIG. 12, may display a first security image using an original image 1312 and display a second security image using a replaced image 1313. In some embodiments, for example, in (b) in FIG. 13, the electronic device 101, based on the case where the electronic device 101 is in the state "b" described as an example in FIG. 12, may display a first security image using a replaced image 1322 and display a second security image using an original image 1323. In some embodiments, for example, in (c) of FIG. 13, the electronic device 101, based on the case where the electronic device 101 is in the state "c" described as an example in FIG. 12, may display a first security image using a replaced image 1332 and display a second security image using an replaced image 1333.

Figure 14:
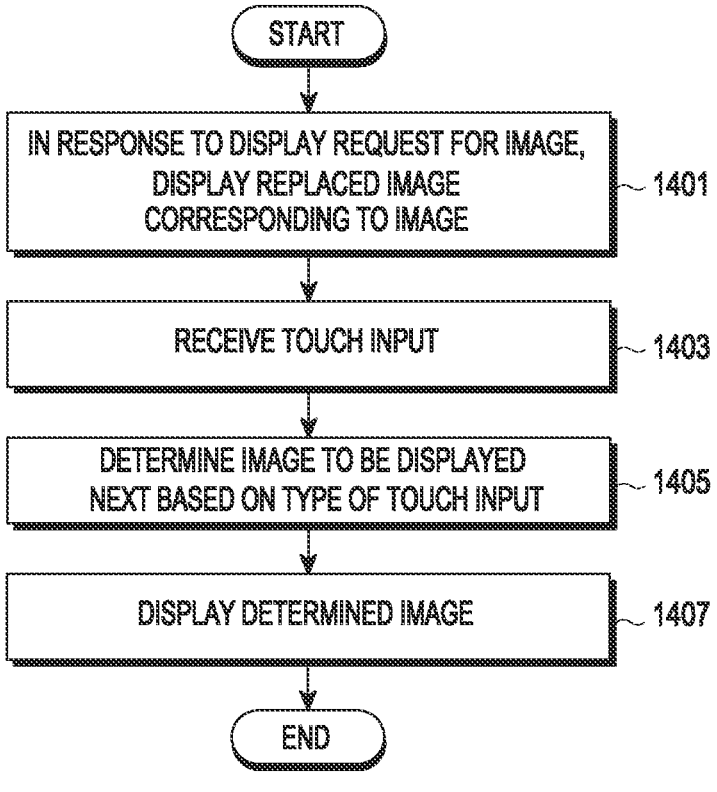
FIG. 14 is a flowchart illustrating a method of operating an electronic device according to an embodiment.
Figure 15:
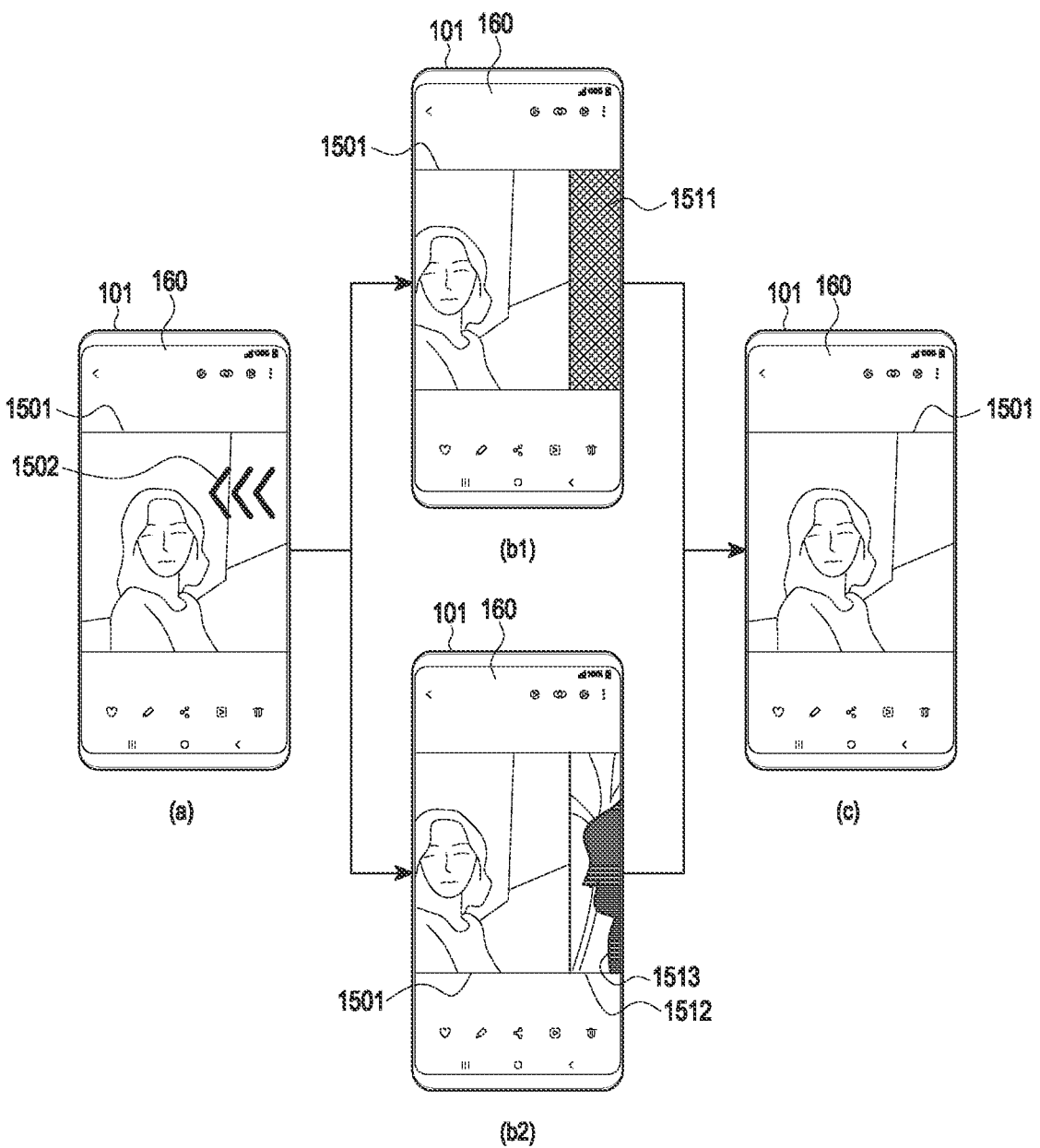
FIG. 15 is a diagram illustrating an operation of an electronic device according to an embodiment.

FIG. 14 is a flowchart illustrating a method of operating an electronic device according to an embodiment. FIG. 14 will be described with reference to FIGS. 15, 16, and 17. FIG. 15 is a diagram illustrating an operation of an electronic device according to an embodiment. FIG. 16 is a diagram illustrating an operation of an electronic device according to an embodiment. FIG. 17 is a diagram illustrating an operation of an electronic device according to an embodiment.

Referring to FIG. 14, in operation 1401, according to an embodiment, the electronic device 101 (e.g., the processor 120 of the electronic device 101), in response to a display request for an image, may display a replaced image (or a portion of a replaced image) corresponding to the image.

In operation 1403, according to an embodiment, the electronic device 101 may receive a user's touch input to the display module 160 after the replaced image (or a portion of the replaced image) corresponding to the image is displayed. The user's touch input may indicate an input of touching the surface of the display module 160 using the user's finger, an input of touching the surface of the display module 160 using a separate input device (e.g., a stylus pen), or a user input electrically received by the electronic device 101 using a separate input device (e.g., a mouse or a pad that receives a touch input of a separate stylus pen) connected to the electronic device 101 through wired or wireless communication.

In operation 1405, according to an embodiment, the electronic device 101 may determine an image to be displayed next, based on the type of the received user's touch input.

In operation 1407, according to an embodiment, the electronic device 101 may display the determined image.

For example, referring to FIG. 15, the electronic device 101 may identify a user input 1502 (e.g., a swipe input) that requests displaying a next image while a general image 1501 is being displayed as shown in (a) of FIG. 15. If the next image is a security image, the electronic device 101, based on the type of the user input 1502 (e.g., a swipe input), may display a portion of a replaced image (e.g., 1511 or 1512) corresponding to the security image as shown in (b1) or (b2) of FIG. 15. For example, the replaced image 1511 may be an image selected from predetermined images according to the type of security image and the characteristics of at least one object included in the security image, and the replaced image 1512 may be an image in which an area 1513 corresponding to at least one security object included in the security image is modulated. The electronic device 101 may display a portion of a previously displayed general image 1501 and a portion of a replaced image (e.g., 1511 or 1512) corresponding to a security image as shown in (b1) or (b2) of FIG. 15, and then display again the entirety of the previously displayed general image 1501 as shown in (c) of FIG. 15.

Figure 16:
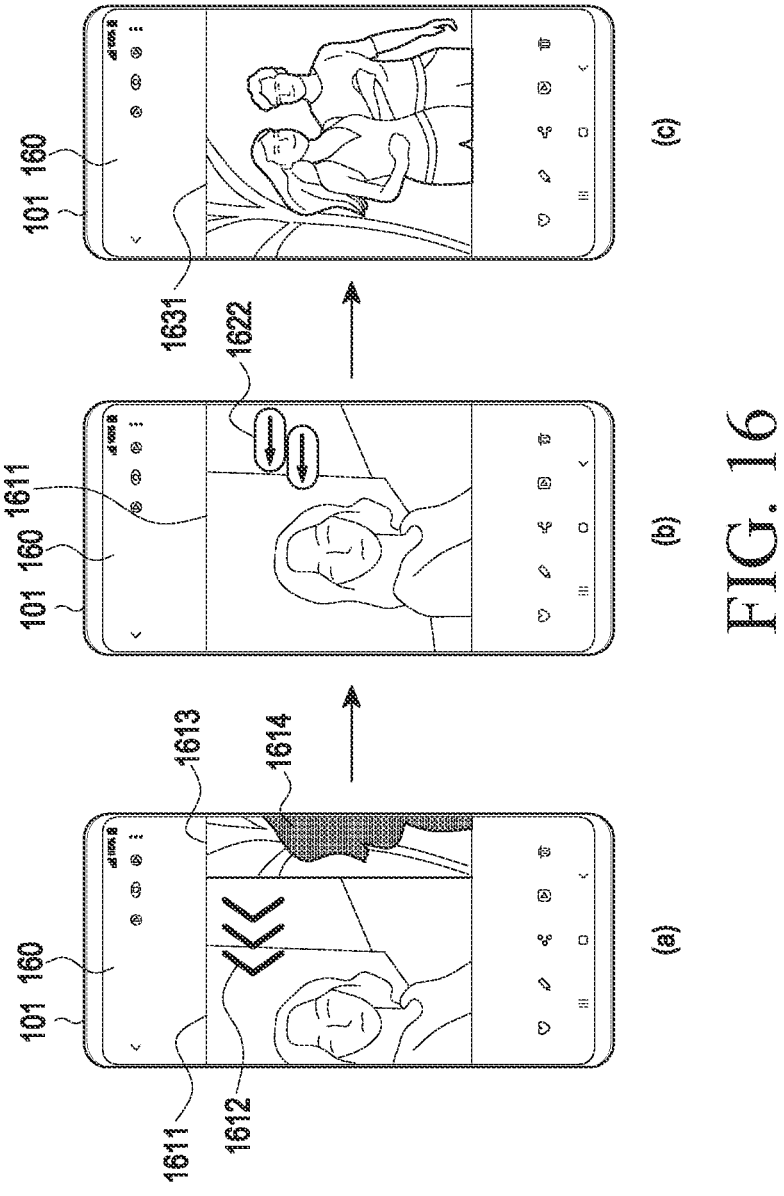
FIG. 16 is a diagram illustrating an operation of an electronic device according to an embodiment.
Figure 17:
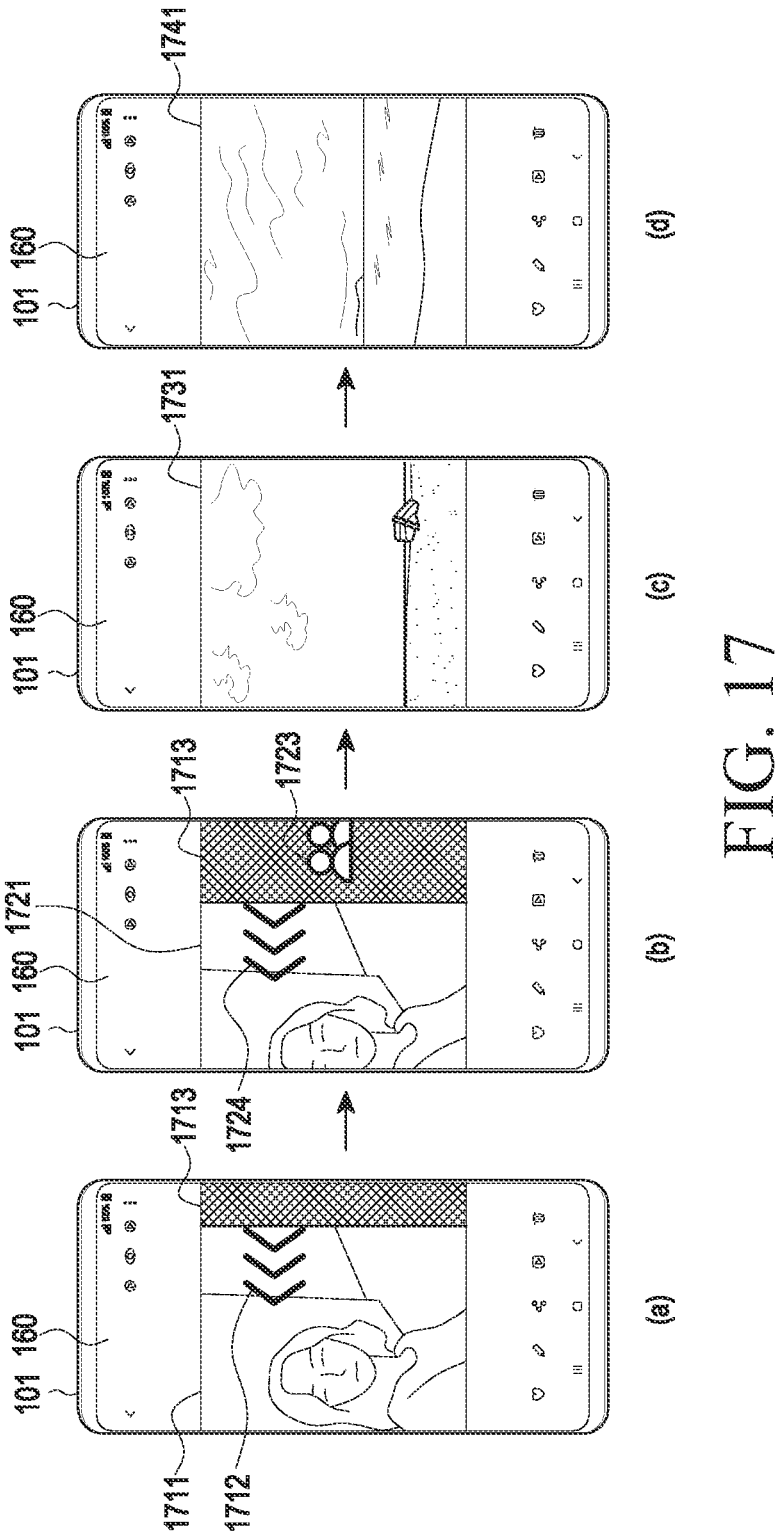
FIG. 17 is a diagram illustrating an operation of an electronic device according to an embodiment.

In some embodiments, for example, referring to FIG. 16, in response to a user input 1612 that requests displaying a next image while a general image 1611 is being displayed as shown in (a) of FIG. 16, the electronic device 101 may display a portion of the previously displayed general image 1611 and a portion of a replaced image 1613 corresponding to a security image, and the replaced image 1613 may be an image in which an area 1614 corresponding to at least one security object included in the security image is modulated, and then display again the entirety of the previously displayed general image 1611 as shown in (b) of FIG. 16. The electronic device 101 may receive a user's touch input 1622 to the display module 160 while the entirety of the general image 1611 is displayed again as shown in (b) of FIG. 16. The electronic device 101, as shown in (c) of FIG. 16, may display an original image 1631 of a security image corresponding to the replaced image 1613, based on the type of the user's touch input 1622 (e.g., a two-finger swipe input).

In some embodiments, for example, referring to FIG. 17, in response to a user input 1712 that requests displaying a next image while a general image 1711 is being displayed as shown in (a) of FIG. 17, the electronic device 101 may display a portion of the previously displayed general image 1711 and a portion of a replaced image 1713 corresponding to a security image. Thereafter, although not shown in FIG.

17, the electronic device 101 may display the entirety of the previously displayed general image 1711 again, or maintain the state of displaying a portion of the previously displayed general image 1711 and a portion of the replaced image 1713 corresponding to a security image until receiving a next user input as shown in (b) of FIG. 17. In this case, a portion of the replaced image 1713 may include an object 1723 corresponding to the type of security image corresponding to the replaced image 1713 and/or the characteristics of at least one object included in the security image. Thereafter, although not shown in FIG. 17, in the state in which the entirety of the previously displayed general image 1711 is displayed again or in the state in which a portion of the previously displayed general image 1711 and a portion of the replaced image 1713 corresponding to the security image are displayed as shown in (b) of FIG. 17, the electronic device 101 may receive a user's touch input 1724 to the display module 160. The electronic device 101 may display a next general image 1731, instead of the security image, based on the type of the user's touch input 1724 (e.g., a swipe input). For example, the next general image 1731 may be an image configured as a first image group together with the general image 1711 displayed previously or as a second image group different from the general image 1711 displayed previously. The image group may be configured according to the type of image, the characteristics of at least one object included in the image, the date and/or time at which the image is produced, or the location of the electronic device 101 when the image is produced. If the general image 1731 displayed in (c) of FIG. 17 is an image belonging to the first image group, the electronic device 101, in response to a user input that requests displaying a next image while the general image 1731 is being displayed, may display a next general image 1741 belonging to the first image group. In some embodiments, if the general image 1731 displayed in (c) of FIG. 17 is an image belonging to the second image group, the electronic device 101, in response to a user input that requests displaying a next image while the general image 1731 is being displayed, may display a next general image 1741 belonging to the second image group.

Figure 18:
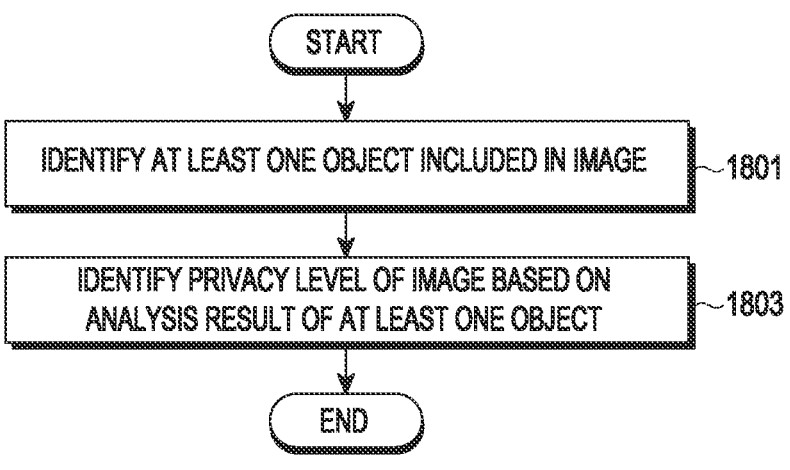
FIG. 18 is a flowchart illustrating a method of operating an electronic device according to an embodiment.

FIG. 18 is a flowchart illustrating a method of operating an electronic device according to an embodiment. FIG. 18 will be described with reference to FIG. 19. FIG. 19 is a diagram illustrating an operation of an electronic device according to an embodiment.

Referring to FIG. 18, in operation 1801, according to an embodiment, the electronic device 101 (e.g., the processor 120 of the electronic device 101) may identify at least one object included in an image.

In operation 1803, according to an embodiment, the electronic device 101 may identify a privacy level of the image, based on an analysis result of at least one object included in the image.

For example, referring to FIG. 19, the electronic device 101 may determine the type of first image to be a people image, based on a people object included in the first image, and identify that the first image is a group people image including three (or more) people, based on three (or more) objects indicating people included in the first image, and in this case, the electronic device 101 may determine the privacy level of the first image as privacy level 1. In some embodiments, for example, referring to FIG. 19, the electronic device 101 may determine the type of the second image to be a people image, based on a people object included in the second image, and determine the privacy level of the second image as privacy level 2, based on the case where there is one object representing the people included in the second image or based on the case where the characteristics of the object representing the people included in the second image indicate the people not wearing clothes. In some embodiments, for example, referring to FIG. 19, the electronic device 101 may determine the type of the second image to be a people image, based on a people object included in the second image, and identify that the first image is a people image including two people, based on the case where there is two objects representing the people included in the second image, and in this case, the electronic device 101 may determine the privacy level of the second image as privacy level 3. In some embodiments, for example, referring to FIG. 19, the electronic device 101 may determine the type of a fourth image to be an ID image, based on a face object and a resident registration number object included in the fourth image, and identify that the fourth image is an ID image of the user of the electronic device 101, based on the case where the resident registration number object included in the fourth image corresponds to the resident registration number of the user of the electronic device 101 or where the face object included in the fourth image corresponds to a face of the user of the electronic device 101, and in this case, the electronic device 101 may determine the privacy level of the fourth image as privacy level 2. In some embodiments, for example, referring to FIG. 19, the electronic device 101 may determine the type of a fifth image to be an ID image, based on a face object and a resident registration number object included in the fifth image, and identify that the fifth image is an ID image of someone else, based on the case where the resident registration number object included in the fifth image corresponds to the resident registration number of the user of the electronic device 101 or where the face object included in the fifth image corresponds to a face of someone else other than the user of the electronic device 101, and in this case, the electronic device 101 may determine the privacy level of the fifth image as privacy level 3. In some embodiments, for example, referring to FIG. 19, the electronic device 101 may determine the type of a sixth image as a document image, based on a paper object and/or a character string object included in the sixth image, and may determine the privacy level of the sixth image as privacy level 1, based on the case where the number of objects including security information, among at least one character string object included in the image, is less than a threshold value. In some embodiments, for example, referring to FIG. 19, the electronic device 101 may determine the type of a seventh image to be a document image, based on a paper object and/or a character string object included in the seventh image, and may determine the privacy level of the seventh image as privacy level 2, based on the case where the number of objects including security information, among at least one character string object included in the image, is greater than or equal to a threshold value. In some embodiments, for example, referring to FIG. 19, the electronic device 101 may determine the type of an eighth image to be a document image, based on a paper object and/or a character string object included in the eighth image, and may determine the privacy level of the eighth image as privacy level 3, based on the case where at least one character string object included in the image is an object related to someone else's security information. The criteria for determining the privacy level of an image are merely exemplary, and there are not specifically limited.

Figure 20:
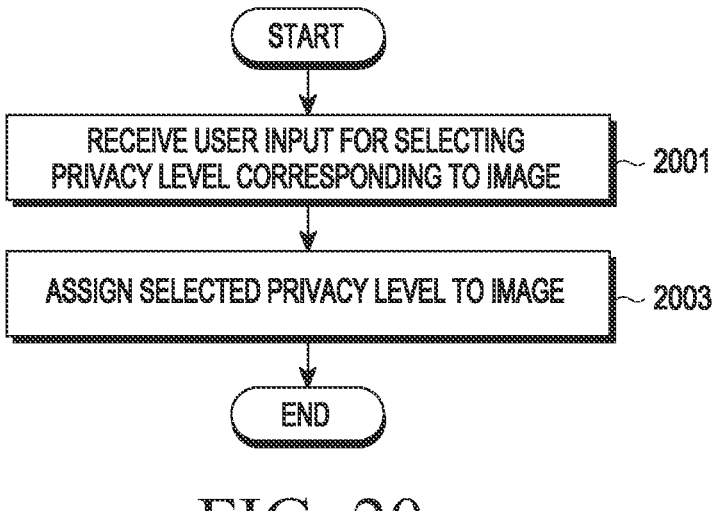
FIG. 20 is a flowchart illustrating a method of operating an electronic device according to an embodiment.

FIG. 20 is a flowchart illustrating a method of operating an electronic device according to an embodiment.

Referring to FIG. 20, in operation 2001, according to an embodiment, the electronic device 101 (e.g., the processor 120 of the electronic device 101) may receive a user input for selecting a privacy level corresponding to an image. For example, the user may perform an input for selecting a privacy level corresponding to a specific image through a screen provided through the display module 160 of the electronic device 101.

In operation 2003, according to an embodiment, the electronic device 101 may assign the selected privacy level to the image. For example, the electronic device 101 may determine the privacy level of a specific image as a privacy level (e.g., privacy level 1, 2, or 3) selected to correspond to the image.

Figure 21:
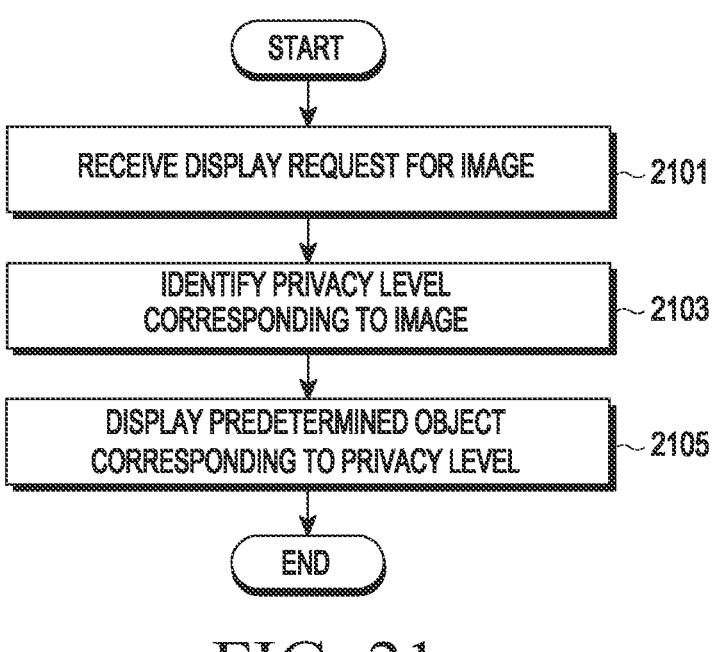
FIG. 21 is a flowchart illustrating a method of operating an electronic device according to an embodiment.
Figure 22:
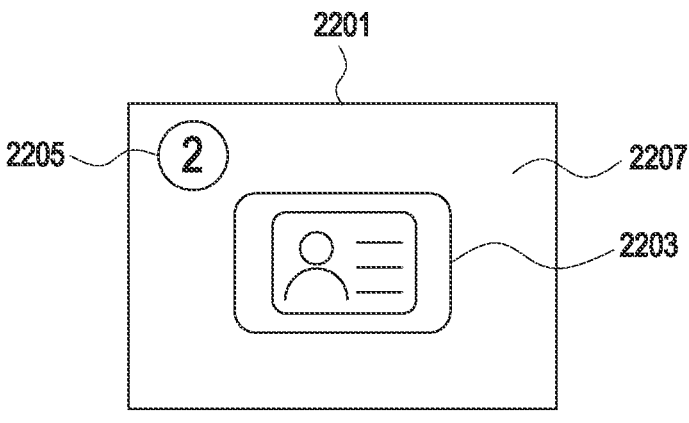
FIG. 22 is a diagram illustrating an operation of an electronic device according to an embodiment.

FIG. 21 is a flowchart illustrating a method of operating an electronic device according to an embodiment. FIG. 21 will be described with reference to FIG. 22. FIG. 22 is a diagram illustrating an operation of an electronic device according to an embodiment.

Referring to FIG. 21, in operation 2101, according to an embodiment, the electronic device 101 (e.g., the processor 120 of the electronic device 101) may receive a display request for an image.

In operation 2103, according to an embodiment, the electronic device 101 may identify a privacy level corresponding to the image for which the display request is received.

In operation 2105, according to an embodiment, the electronic device 101 may display an object corresponding to the privacy level of the image. The object may be predetermined.

For example, referring to FIG. 22, the electronic device 101 may receive a display request for an ID image corresponding to a security image. The electronic device 101 may identify that the privacy level of the ID image is privacy level 2. In response to a display request for the ID image corresponding to a security image, the electronic device 101 may display an object (e.g., an object 2205 representing privacy level 2) corresponding to privacy level 2, which is the privacy level of the ID image. For example, in response to a display request for the ID image, the electronic device 101 may display a replaced image 2201 including an object 2203 representing an ID image, which is the type of the image, and an object specific 2205 representing the privacy level of the image.

Figure 23:
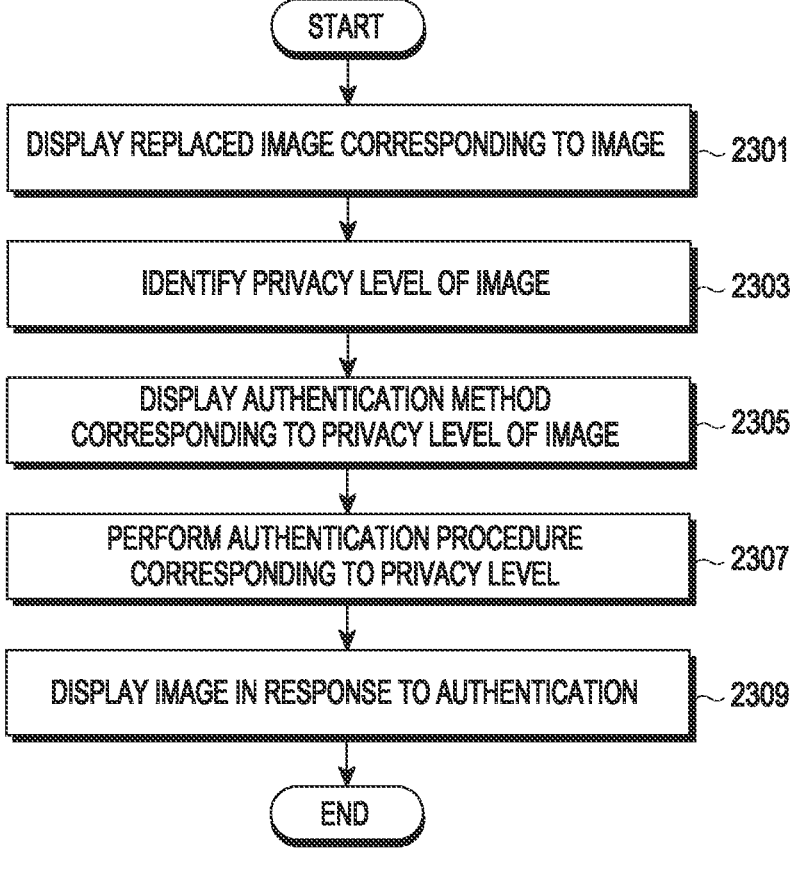
FIG. 23 is a flowchart illustrating a method of operating an electronic device according to an embodiment.

FIG. 23 is a flowchart illustrating a method of operating an electronic device according to an embodiment.

Referring to FIG. 23, in operation 2301, according to an embodiment, the electronic device 101 (e.g., the processor 120 of the electronic device 101) may display a replaced image corresponding to an image. For example, in response to a display request for a security image, the electronic device 101 may display a replaced image corresponding to the security image.

In operation 2303, according to an embodiment, the electronic device 101 may identify a privacy level of an original image corresponding to the displayed replaced image.

In operation 2305, according to an embodiment, the electronic device 101 may display an authentication method corresponding to the identified privacy level. For example, the electronic device 101 may display a notification describing an authentication method corresponding to the privacy level, according to the privacy level of the image. For example, the electronic device 101 may display an object corresponding to password input or security pattern input, based on the fact that the privacy level of the image is privacy level 1. In some embodiments, for example, the electronic device 101 may display an object corresponding to fingerprint recognition, iris (eyeball) recognition, or face recognition, based on the fact that the privacy level of the image is privacy level 2. In some embodiments, for example, the electronic device 101 may display an object indicating that authentication is required through an external device, based on the fact that the privacy level of the image is privacy level 3. The authentication methods corresponding to the privacy level are merely exemplary, and the authentication method is not limited.

In operation 2307, according to an embodiment, the electronic device 101 may perform an authentication procedure corresponding to the privacy level. For example, based on privacy level 1, the electronic device 101 may perform an authentication procedure of a security pattern input 2642 as shown in (d) of FIG. 26 to be described later. In some embodiments, for example, based on privacy level 2, the electronic device 101 may perform an authentication procedure of fingerprint recognition 2833 or iris (eyeball) recognition 2832 as shown in (c) of FIG. 28 to be described later. In some embodiments, for example, the electronic device 101, based on a user input requesting execution of an authentication procedure corresponding to privacy level 3 or based on identifying privacy level 3, regardless of the presence or absence of a user input, may perform the authentication procedure of transmitting an authentication request signal to an external device associated with at least one object included in the image and receiving an authentication signal from the external device. For example, the external device associated with at least one object included in the image may include a first external device associated with someone else corresponding to a face included in an ID image, a second external device associated with someone else corresponding to an account number included in a contract document, or a third external device associated with someone else corresponding to the people included in a people image, but is not specifically limited.

In operation 2309, the electronic device 101 may display the image in response to the authentication (i.e., a successful authentication). For example, in response to completion of authentication according to operation 2307, the electronic device 101 may stop displaying the replaced image and display an original image corresponding to the replaced image.

Figure 24:
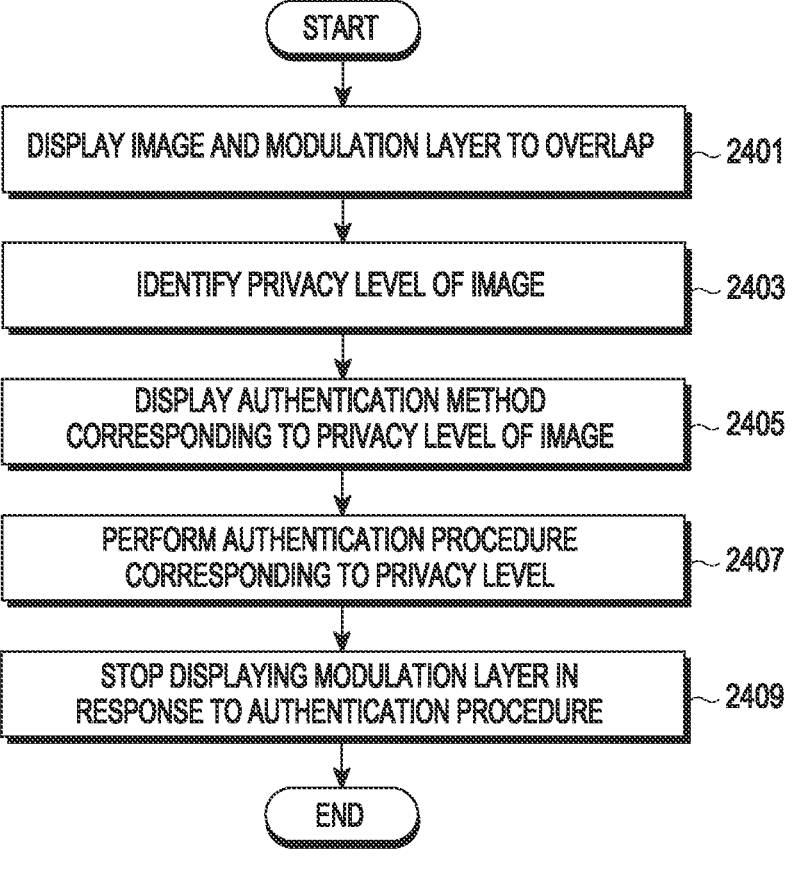
FIG. 24 is a flowchart illustrating a method of operating an electronic device according to an embodiment.

FIG. 24 is a flowchart illustrating a method of operating an electronic device according to an embodiment.

Referring to FIG. 24, in operation 2401, according to an embodiment, the electronic device 101 (e.g., the processor 120 of the electronic device 101) may display an image and a modulation layer so as to overlap each other. For example, in response to a display request for a security image, the electronic device 101 may display an original image of the security image and a modulation layer so as to overlap.

In operation 2403, according to an embodiment, the electronic device 101 may identify a privacy level of the original image.

In operation 2405, according to an embodiment, the electronic device 101 may display an authentication method corresponding to the identified privacy level.

In operation 2407, according to an embodiment, the electronic device 101 may perform an authentication procedure corresponding to the privacy level.

In operation 2309, according to an embodiment, the electronic device 101 may stop displaying the modulation layer in response to completion of authentication according to operation 2307. For example, the electronic device 101 may stop displaying the modulation layer while displaying the original image of the security image and the modulation layer to overlap, thereby displaying only the original image of the security image on the display module 160.

Figure 25:
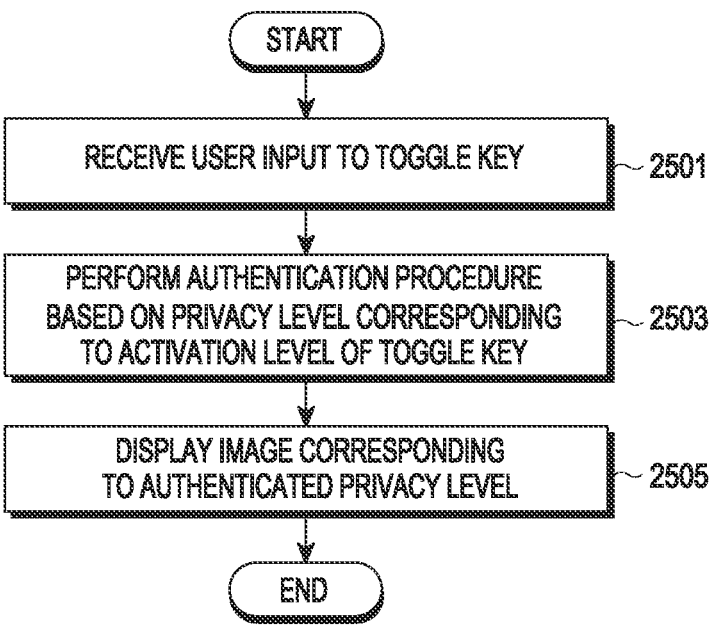
FIG. 25 is a flowchart illustrating a method of operating an electronic device according to an embodiment.
Figure 26:
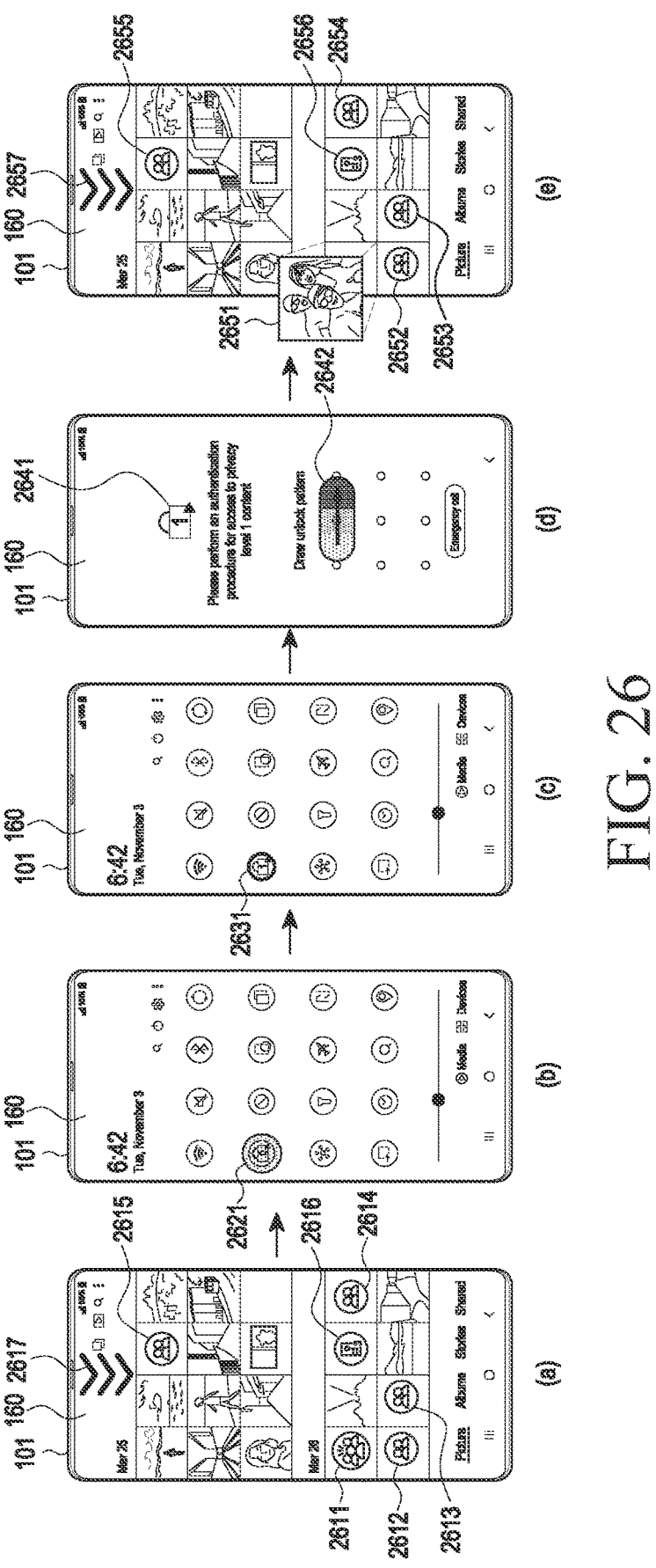
FIG. 26 is a diagram illustrating an operation of an electronic device according to an embodiment.

FIG. 25 is a flowchart illustrating a method of operating an electronic device according to an embodiment. FIG. 25 will be described with reference to FIG. 26. FIG. 26 is a diagram illustrating an operation of an electronic device according to an embodiment.

Referring to FIG. 25, in operation 2501, according to an embodiment, the electronic device 101 (e.g., the processor 120 of the electronic device 101) may receive a user input to a toggle key in relation to total authentication (total identification). The toggle key may be predetermined. Total authentication may indicate performing authentication for at least one security image having the same privacy level at once. Referring to (b) in FIG. 26, the toggle key may indicate a specific object (e.g., a toggle key 2621) displayed on the display module 160 of the electronic device 101. Referring to (b) in FIG. 26, a user input to the toggle key may indicate a user's touch input to a specific object (e.g., a toggle key 2621) displayed on the display module 160 of the electronic device 101. For example, referring to (a) in FIG. 26, the electronic device 101 may display at least one image. For example, the electronic device 101 may display a replaced image corresponding to at least one security image. For example, referring to (a) in FIG. 26, the electronic device 101 may display a first replaced image 2611 corresponding to a first security image having privacy level 1, a second replaced image 2616 corresponding to a second security image having privacy level 2, a third replaced image 2612 corresponding to a third security image having privacy level 3, a fourth replaced image 2613 corresponding to a fourth security image having privacy level 3, a fifth replaced image 2614 corresponding to a fifth security image having privacy level 3, a sixth replaced image 2615 corresponding to a sixth security image having privacy level 3, and at least one general image. In this state, the electronic device 101 may display a screen including a toggle key 2621 shown in (b) of FIG. 26, based on a user input 2617 requesting displaying a toggle key, and receive a user input to the toggle key 2621.

In operation 2503, according to an embodiment, the electronic device 101 may perform an authentication procedure based on a privacy level corresponding to an activation level of the toggle key. For example, the electronic device 101 may identify a privacy level corresponding to the activation level of the toggle key according to the user input to the toggle key and, based on the identified privacy level, perform an authentication procedure corresponding to the privacy level. For example, referring to FIG. 26, the electronic device 101 may receive a user input to the toggle key 2621 that has not yet been activated in (b) in FIG. 26 and, based on a user input, display an object indicating that the toggle key was activated as level 1 as shown in (c) of FIG. 26. For example, based on the case in which the activation level of the toggle key is 1, the electronic device 101 may immediately display an object 2641 representing an authentication procedure corresponding to privacy level 1 in (d) of FIG. 26 and perform an authentication procedure corresponding to privacy level 1 (e.g., a procedure of a security pattern input 2642). In some embodiments, as another example, the electronic device 101, based on the fact that a predetermined time elapses after the activation level of the toggle key is changed, may perform an authentication procedure as described above, based on the changed activation level (e.g., activation level 1), in (d) of FIG. 26. If a user input to the toggle key is received again before the predetermined time elapses, the activation level of the toggle key may change again, and in this case, for example, the activation level of the toggle key may change into 2. In this case, the electronic device 101 may also wait for the predetermined time to elapse after the activation level of the toggle key is changed to 2.

In operation 2505, according to an embodiment, based on completion of an authentication procedure corresponding to a privacy level corresponding to the activation level of the toggle key, the electronic device 101 may display an original image corresponding to at least one security image corresponding to the authenticated privacy level. For example, referring to (d) in FIG. 26, the electronic device 101, in response to completion of a security pattern authentication procedure corresponding to privacy level 1, may display an original image 2651 corresponding to a first security image having privacy level 1. For example, the electronic device 101 may display an original image 2651 corresponding to a first security image having privacy level 1 and display at least one security image (e.g., a second, third, fourth, fifth, and sixth security images) having privacy level 2 and/or privacy level 3 using previously displayed replaced images (e.g., 2652, 2653, 2654, 2655, and 2656). Then, for example, the electronic device 101 may further receive a user input 2657 and, in response thereto, repeatedly perform operations 2501, 2503, and 2505 described above to display at least one original image corresponding to at least one image corresponding to privacy level 2 and/or privacy level 3.

Figure 27:
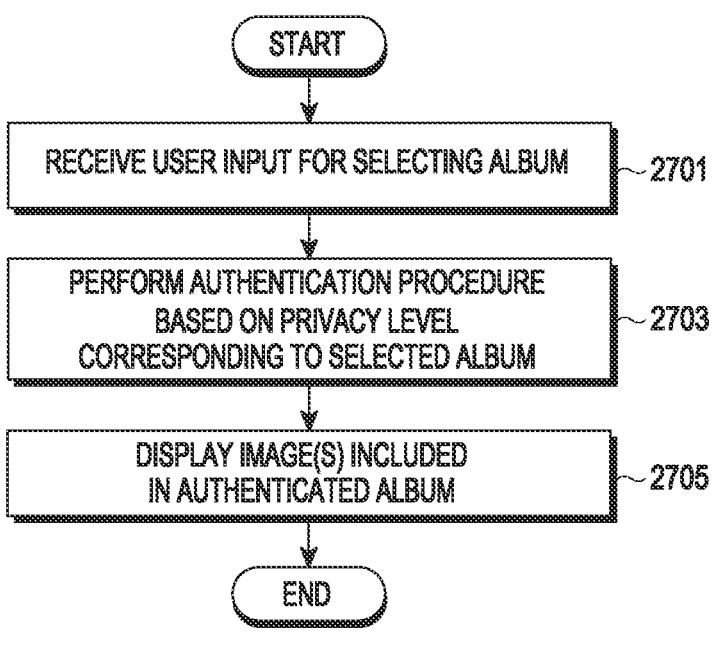
FIG. 27 is a flowchart illustrating a method of operating an electronic device according to an embodiment.
Figure 28:
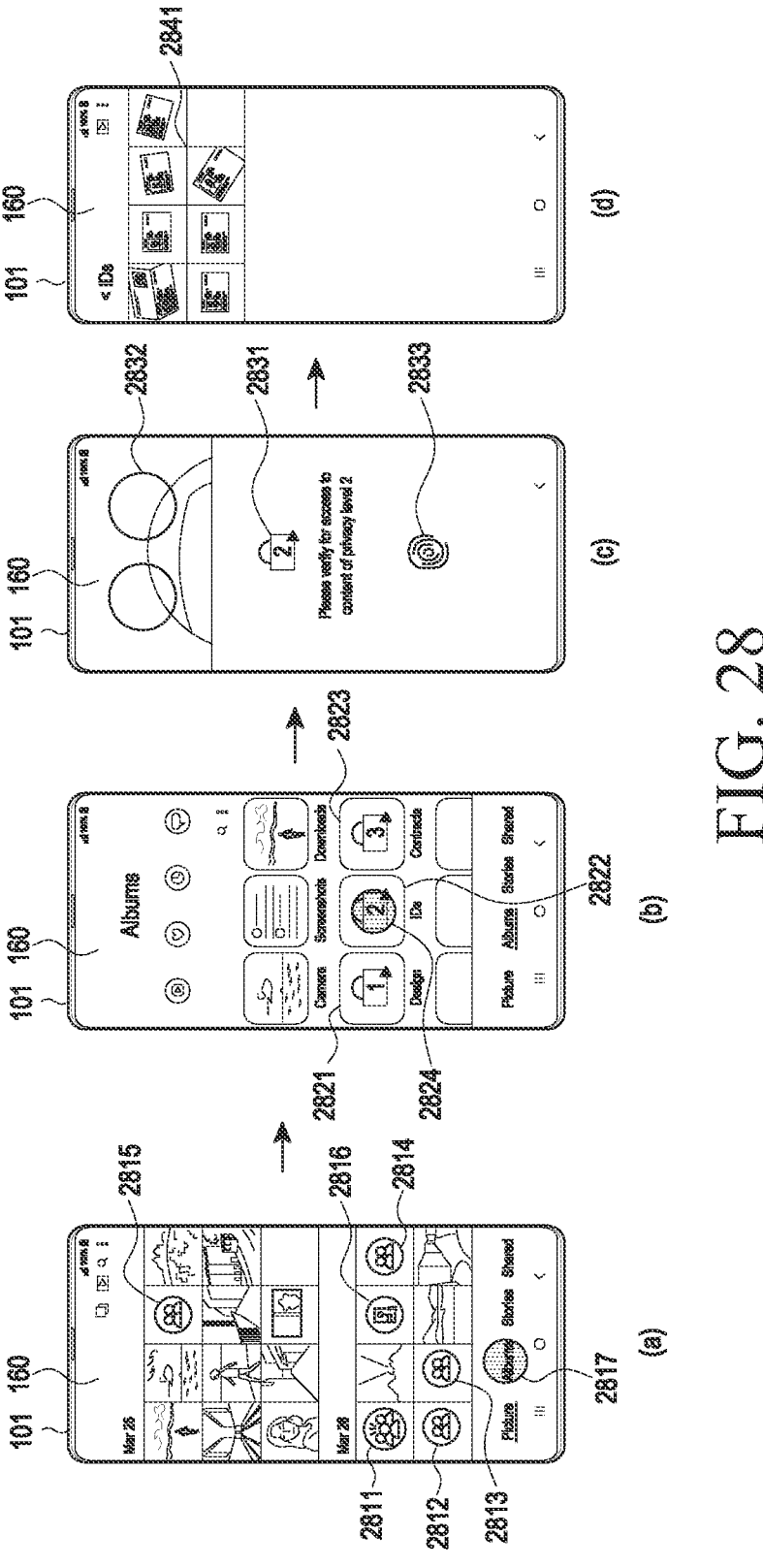
FIG. 28 is a diagram illustrating an operation of an electronic device according to an embodiment.

FIG. 27 is a flowchart illustrating a method of operating an electronic device according to an embodiment. FIG. 27 will be described with reference to FIG. 28. FIG. 28 is a diagram illustrating an operation of an electronic device according to an embodiment.

Referring to FIG. 27, in operation 2701, according to an embodiment, the electronic device 101 (e.g., the processor 120 of the electronic device 101) may receive a user input for selecting an album. For example, the electronic device 101 may receive a user input for selecting an object representing an album corresponding to a specific privacy level. For example, referring to FIG. 28, the electronic device 101 may receive a user input 2817 requesting displaying images in units of albums in (a) of FIG. 28. In (b) in FIG. 28, based on the user input 2817 requesting displaying images in units of albums, the electronic device 101 may display at least one object representing each album including at least one image corresponding to each privacy level, (e.g., a first object 2821 representing an album corresponding to privacy level 1, a second object 2822 representing an album corresponding to privacy level 2, and/or a third object 2823 corresponding an album corresponding to privacy level 3). In (b) of FIG. 28, the electronic device 101 may receive a user input 2824 for selecting the second object 2822 representing an album corresponding to privacy level 2.

In operation 2703, according to an embodiment, based on a privacy level corresponding to the selected album, the electronic device 101 may perform an authentication procedure corresponding to the privacy level. For example, referring to FIG. 28, based on reception of a user input 2824 for selecting the second object 2822 representing an album corresponding to privacy level 2 in (b) of FIG. 28, the electronic device 101 may display an object 2831 representing an authentication procedure corresponding to privacy level 2 in (c) of FIG. 28 and perform an authentication procedure (e.g., a procedure of fingerprint recognition 2833 and/or a procedure of iris (eyeball) recognition 2832) corresponding to privacy level 2.

In operation 2705, according to an embodiment, the electronic device 101 may display at least one image included in the authenticated album. For example, referring to (d) in FIG. 28, the electronic device 101, based on completion of authentication for an album corresponding to privacy level 2, may display at least one original image 2841 corresponding to at least one security image included in the authenticated album.

Figure 29:
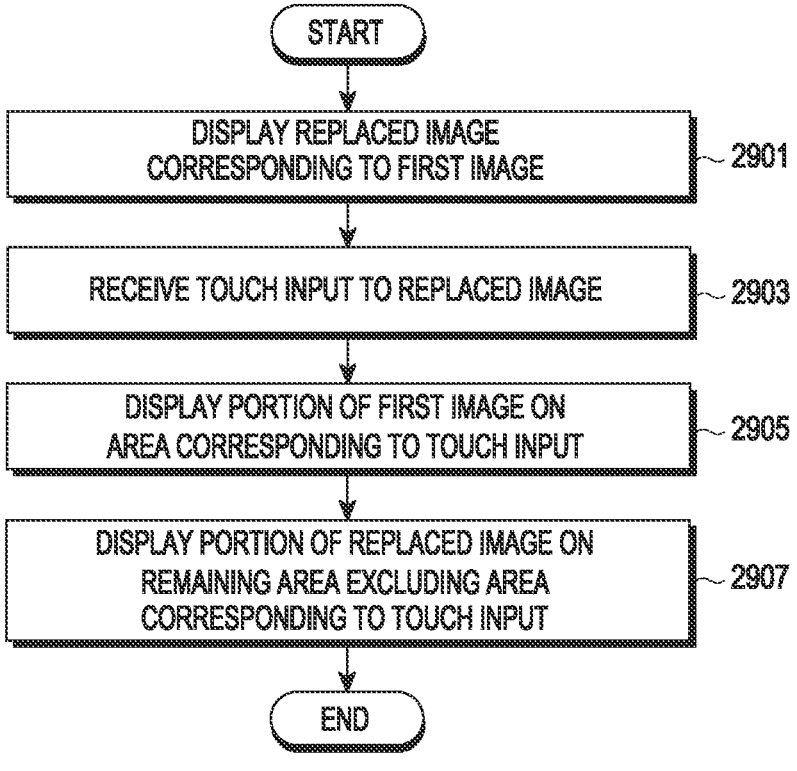
FIG. 29 is a flowchart illustrating a method of operating an electronic device according to an embodiment.
Figure 30:
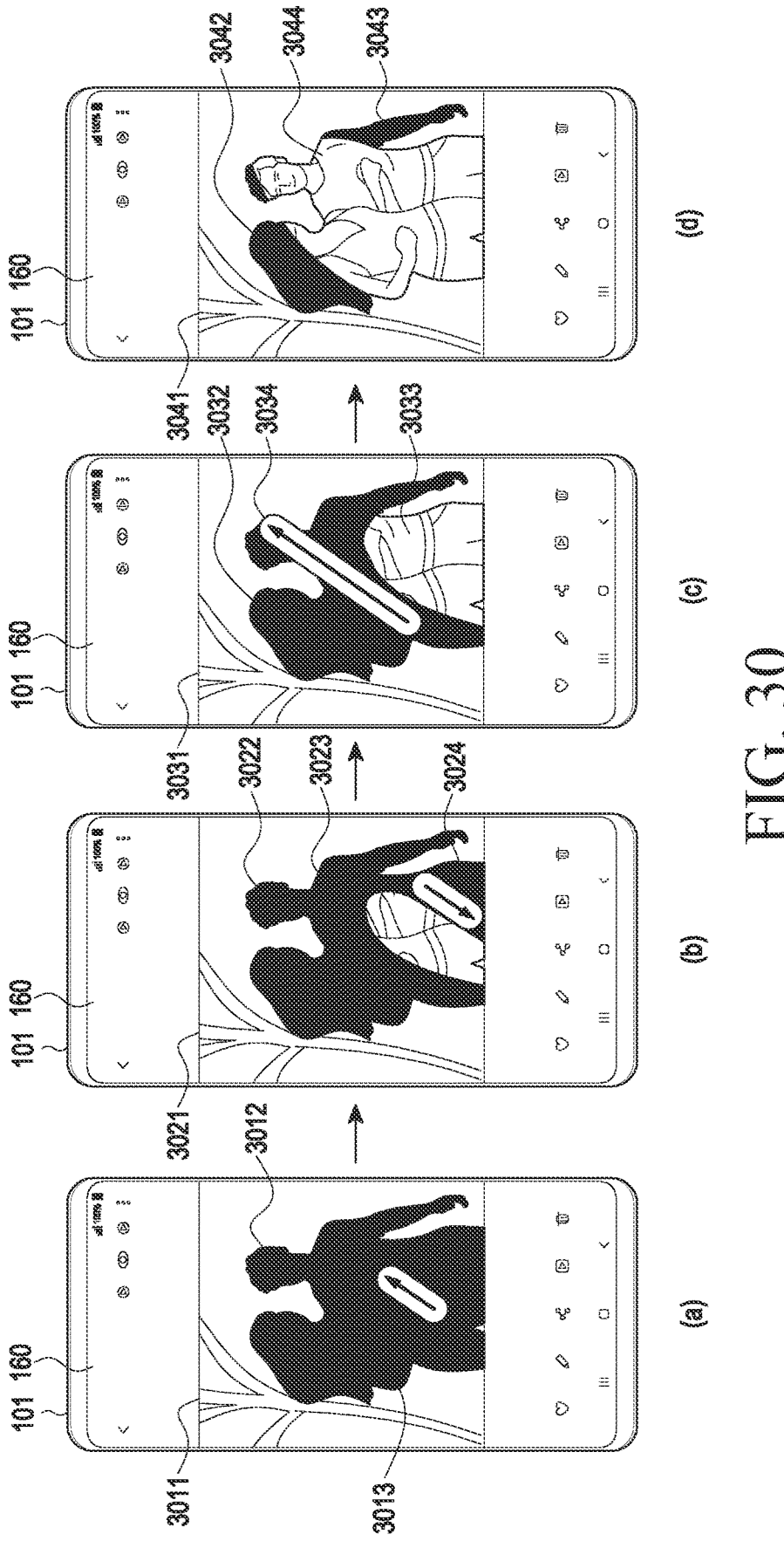
FIG. 30 is a diagram illustrating an operation of an electronic device according to an embodiment.
Figure 31:
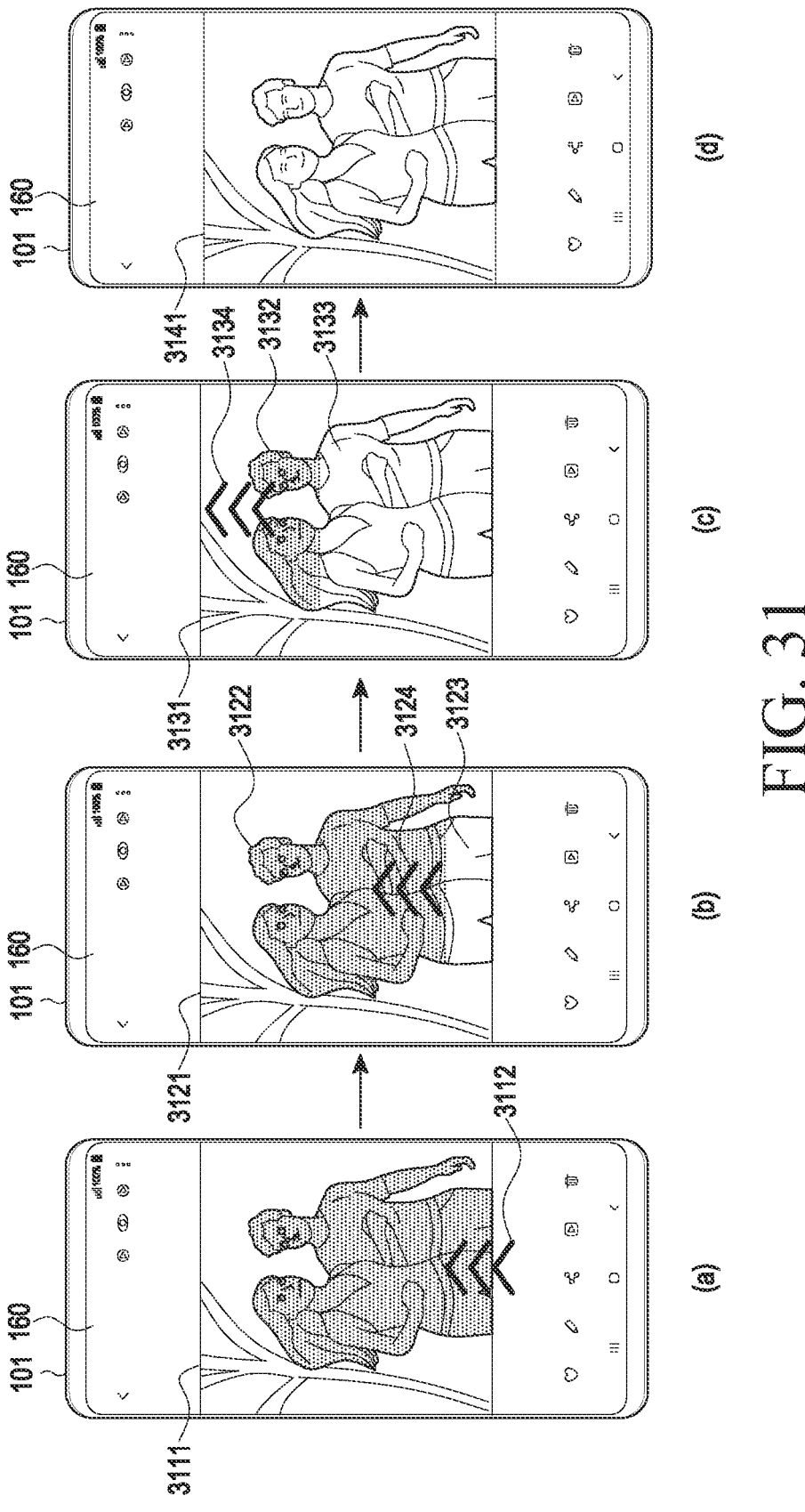
FIG. 31 is a diagram illustrating an operation of an electronic device according to an embodiment.

FIG. 29 is a flowchart illustrating a method of operating an electronic device according to an embodiment. FIG. 29 will be described with reference to FIGS. 30 and 31. FIG. 30 is a diagram illustrating an operation of an electronic device according to an embodiment. FIG. 31 is a diagram illustrating an operation of an electronic device according to an embodiment.

Referring to FIG. 29, in operation 2901, according to an embodiment, the electronic device 101 (e.g., the processor 120 of the electronic device 101) may display a replaced image corresponding to a first image. For example, referring to FIG. 30, the electronic device 101 may display a replaced image 3011 in (a) of FIG. 30.

In operation 2903, according to an embodiment, the electronic device 101 may receive a touch input to the replaced image. For example, referring to FIG. 30, the electronic device 101 may receive a touch input 3013 to a replaced image 3011 in (a) of FIG. 30. For example, the electronic device 101 may receive a touch input 3013 onto a modulation area 3012 included in the replaced image 3011.

In operation 2905, according to an embodiment, the electronic device 101 may display a portion of the first image on an area corresponding to the received touch input. For example, referring to FIG. 30, in (b) of FIG. 30, the electronic device 101 may display a portion of the first image on an area 3023 corresponding to the touch input 3013 received in (a) of FIG. 30. For example, the electronic device 101 may display a portion of an original image of the first image on the area 3023 corresponding to the touch input 3013. In some embodiments, for example, in the case where the replaced image 3011 is displayed by overlapping the original image of the first image and the modulation layer, the electronic device 101 may stop displaying at least partial area of the modulation layer corresponding to the area 3023 corresponding to the touch input 3013, thereby displaying a portion of the original image of the first image on the area 3023 corresponding to the touch input 3013.

In operation 2907, according to an embodiment, the electronic device 101 may display a portion of the replaced image on the remaining area, excluding the area corresponding to the received touch input. For example, referring to FIG. 30, in (b) of FIG. 30, the electronic device 101 may display a portion of a replaced image 3021 on an area 3022 other than the area 3023 corresponding to the touch input 3013 received in (a) of FIG. 30. For example, the electronic device 101 may display the replaced image 3021 on the area 3022 other than the area 3023 corresponding to the touch input 3013. In some embodiments, in the case where the replaced image 3011 is displayed by overlapping the original image of the first image and the modulation layer, the electronic device 101 may display at least partial area of the modulation layer on the area 3022 other than the area 3023 corresponding to the touch input 3013. As shown in (b), (c), and (d) of FIG. 30, the electronic device 101 may repeatedly perform operations 2903, 2905, and 2907, based on subsequent user inputs (e.g., 3024 and 3034).

FIG. 29 will be further described below with reference to FIG. 31.

For example, referring to FIG. 31, in (a) of FIG. 31, the electronic device 101 may receive a user input (e.g., a user input 3112 of wiping on the screen from the bottom to the top) in the state where a replaced image 3111 is displayed. The electronic device 101, in response to the user input 3112, may display at least a portion of an original image corresponding to the replaced image 3111 on an area 3123 to which the user input 3112 was performed in (b) of FIG. 31. A method of displaying at least a portion of an original image may be understood similarly to the method described above in FIG. 30. The electronic device 101 may receive a subsequent user input 3124 in (b) of FIG. 31 and may display at least a portion of an original image corresponding to a replaced image 3121 on an area 3133 to which the user input 3124 was performed in (c) of FIG. 31. In (c) of FIG. 31, the electronic device 101 may receive a subsequent user input 3134 and display an original image 3141 corresponding to a replaced image 3131.

Figure 32:
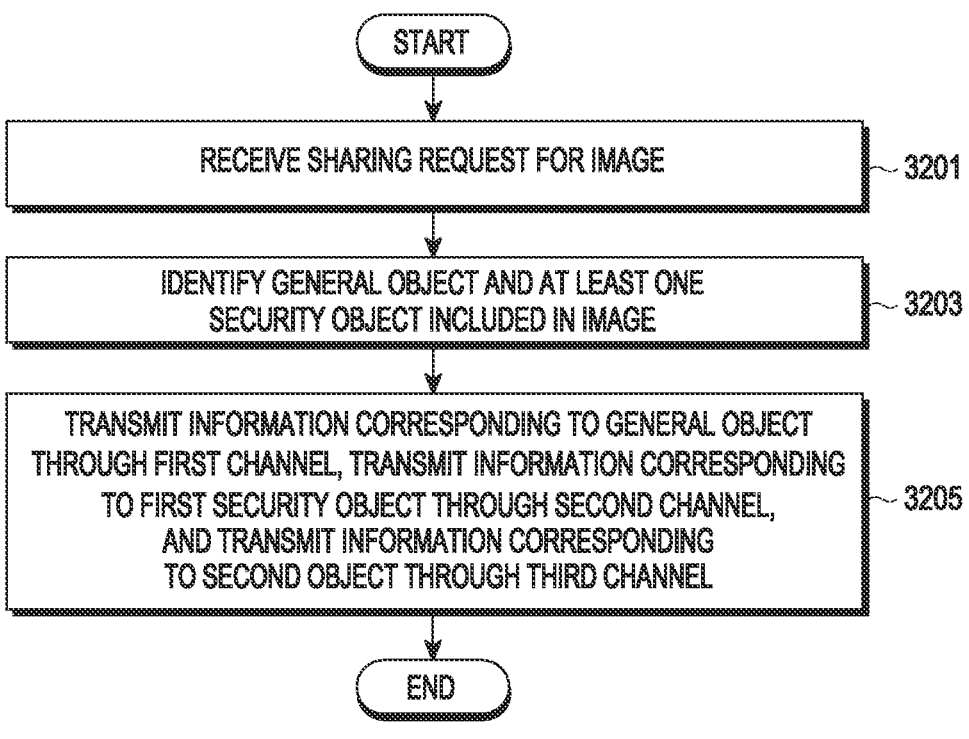
FIG. 32 is a flowchart illustrating a method of operating an electronic device according to an embodiment.
Figure 33:
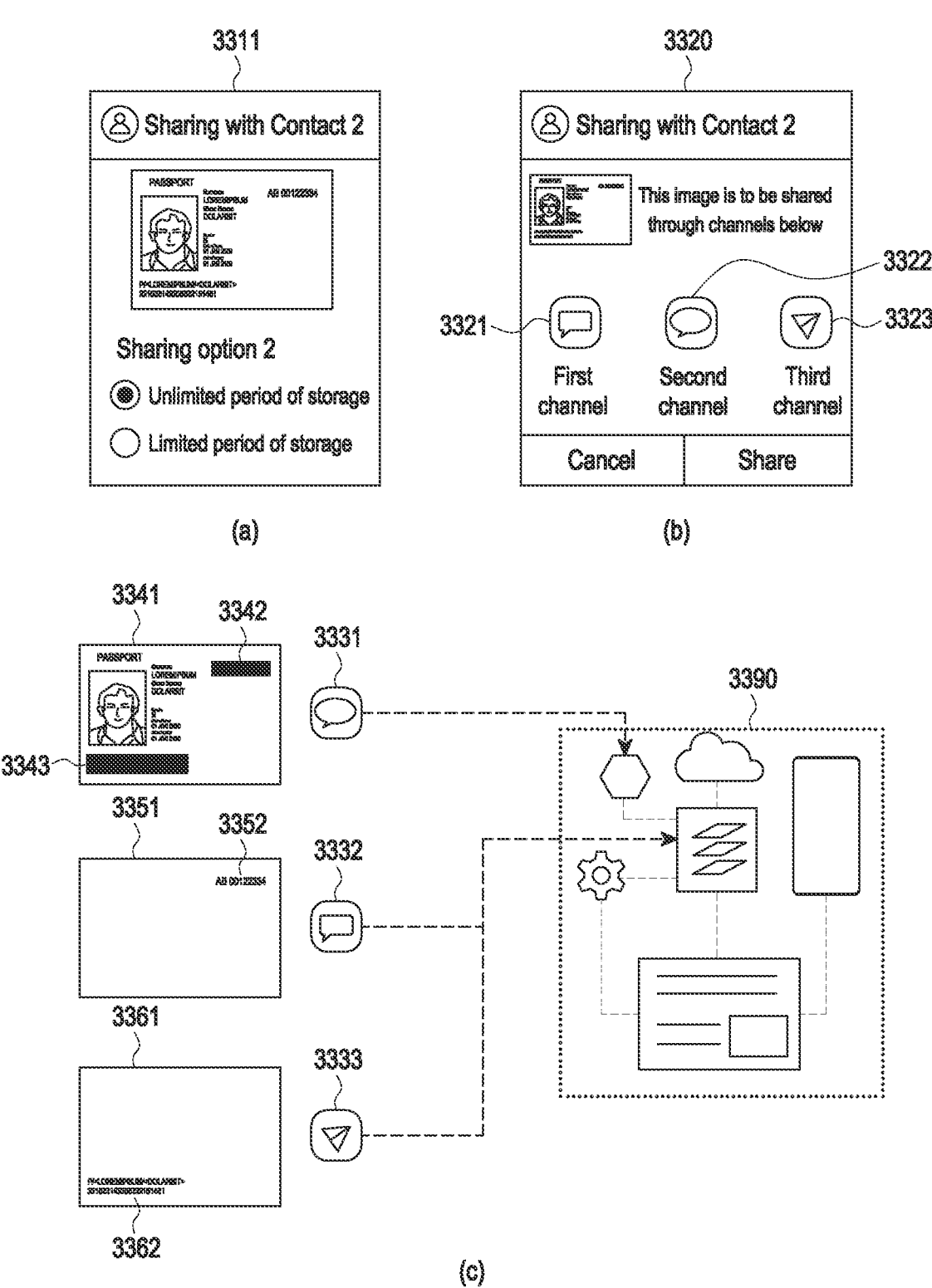
FIG. 33 is a diagram illustrating an operation of an electronic device according to an embodiment.

FIG. 32 is a flowchart illustrating a method of operating an electronic device according to an embodiment. FIG. 32 will be described with reference to FIG. 33. FIG. 33 is a diagram illustrating an operation of an electronic device according to an embodiment.

Referring to FIG. 32, in operation 3201, according to an embodiment, the electronic device 101 (e.g., the processor 120 of the electronic device 101) may receive a sharing request for an image. For example, referring to (a) in FIG. 33, the electronic device 101 may display a notification providing an option for image sharing and receive a sharing request for an image according to a user's selection from the notification.

In operation 3203, according to an embodiment, the electronic device 101 may identify a general object and at least one security object included in the image requested for sharing. For example, referring to (c) in FIG. 33, the electronic device 101 may identify a general object (e.g., an object representing a face) and at least one security object (e.g., an object representing a passport number or an object representing comprehensive information of a passport holder) included in a passport image.

In operation 3205, according to an embodiment, the electronic device 101 may transmit information corresponding to the general object through a first channel (e.g., a first channel 3321), transmit information corresponding to the first security object through a second channel (e.g., a second channel 3322), and transmit information corresponding to a second object through a third channel (e.g., a third channel 3323). The transmission channel may be pre-configured or specified by a user. For example, referring to (c) in FIG. 33, the electronic device 101 may image-process a portion corresponding to the first security object (e.g., an object representing a passport number) and a position corresponding to the second security object (e.g., an object representing comprehensive information of a passport holder), produce information (or a layer) on the portion corresponding to the general object so as to include the original, and transmit the same to an external device 3390 through a first channel 3331, and may produce information (or a layer) corresponding to the first security object (e.g., an object representing a passport number) and transmit the same to the external device 3390 through a second channel 3332, and may produce information (or a layer) corresponding to the second security object (e.g., an object representing a comprehensive number of a passport holder) and transmit the same to the external device 3390 through a third channel 3333.

Figure 34:
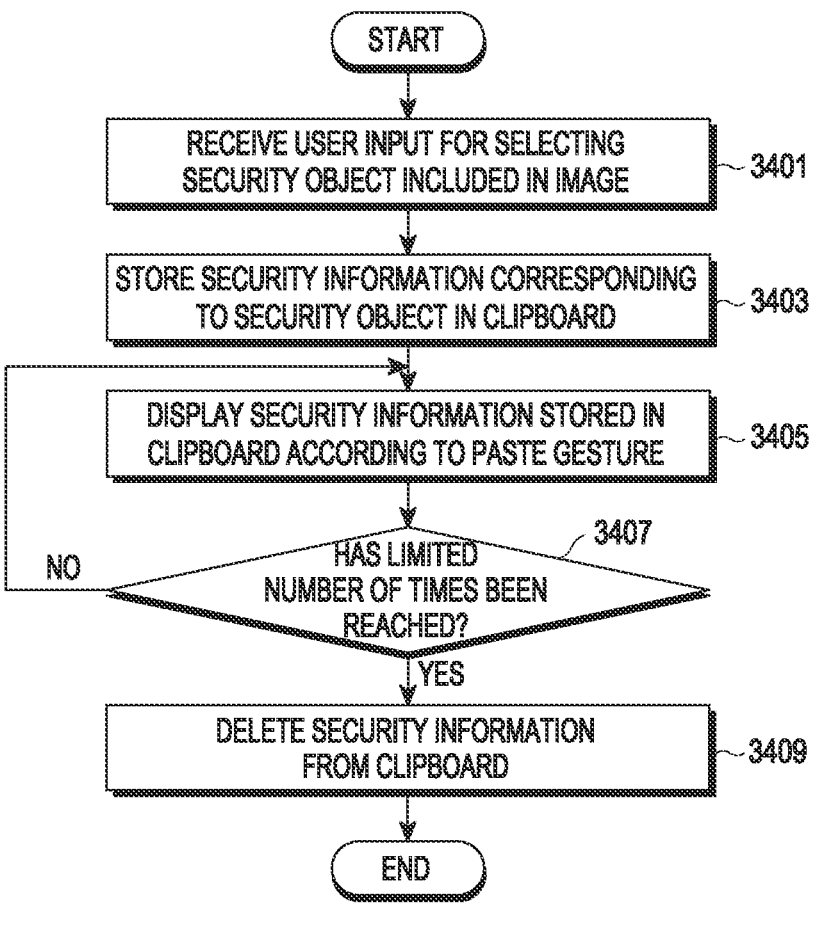
FIG. 34 is a flowchart illustrating a method of operating an electronic device according to an embodiment.

FIG. 34 is a flowchart illustrating a method of operating an electronic device according to an embodiment.

Referring to FIG. 34, in operation 3401, according to an embodiment, the electronic device 101 (e.g., the processor 120 of the electronic device 101) may receive a user input for selecting a security object included in an image.

In operation 3403, according to an embodiment, the electronic device 101 may store security information corresponding to the security object in a clipboard.

In operation 3405, according to an embodiment, the electronic device 101 may display security information stored in the clipboard at a specified position according to a paste gesture.

In operation 3407, according to an embodiment, the electronic device 101 may determine whether or not a limited number of times related to the security information stored in the clipboard has been reached.

In operation 3409, according to an embodiment, the electronic device 101 may delete the security information from the clipboard, based on identifying that the limited number of times related to the security information stored in the clipboard has been reached (3407, YES).

Figure 35:
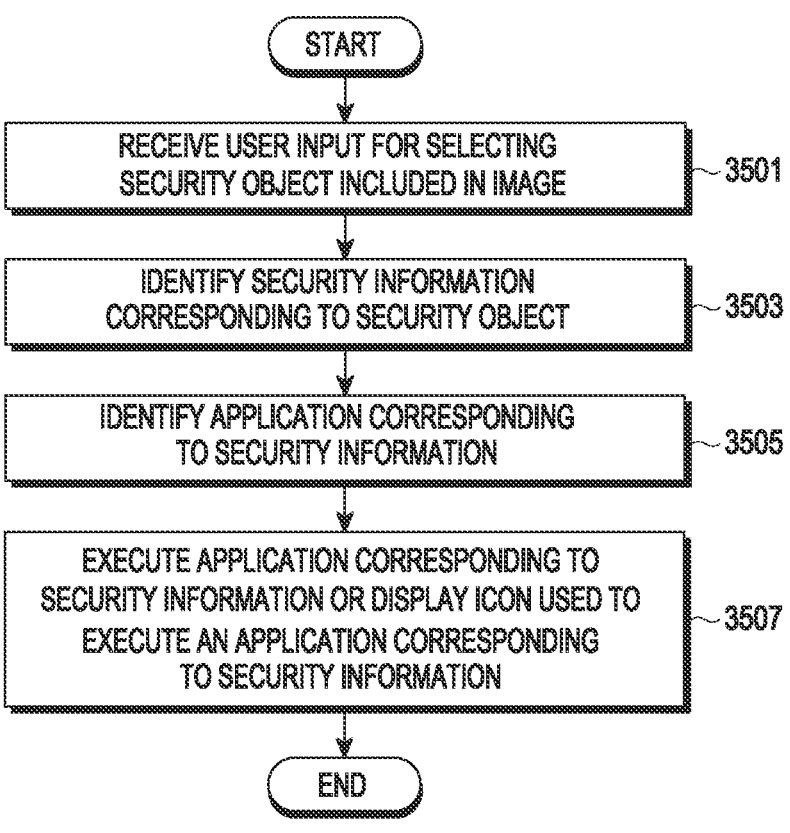
FIG. 35 is a flowchart illustrating a method of operating an electronic device according to an embodiment.

FIG. 35 is a flowchart illustrating a method of operating an electronic device according to an embodiment.

Referring to FIG. 35, in operation 3501, according to an embodiment, the electronic device 101 (e.g., the processor 120 of the electronic device 101) may receive a user input for selecting a security object included in an image. For example, the electronic device 101 may receive a user input for selecting an account number object included in a contract document image.

In operation 3503, according to an embodiment, the electronic device 101 may identify security information corresponding to the selected security object. For example, the electronic device 101 may identify account number information corresponding to the account number object.

In operation 3505, according to an embodiment, the electronic device 101 may identify an application corresponding to the identified security information. For example, the electronic device 101 may identify a banking application corresponding to the identified account number information.

In operation 3507, according to an embodiment, the electronic device 101 may execute an application corresponding to the security information or display an icon used to execute an application corresponding to the security information. For example, the electronic device 101 may execute a banking application corresponding to the account number information or display an icon used to execute the banking application.

According to various embodiments, an electronic device 101 may include a display (e.g., the display module 160) and a processor 120, wherein the processor may be configured to identify a display request for a plurality of images including a first image, identify at least one object included in the first image, determine, based on the case where the first image includes at least one security object, to display a replaced image determined based on the at least one object included in the first image, determine, based on the case where at least one other image that is distinct from the first image, among the plurality of images, does not include a security object, to display the at least one other image, and control the display to display the replaced image corresponding to the first image together with the at least one other image.

According to various embodiments, the processor may be configured to determine a type of the first image, based on the at least one object included in the first image, determine to display a first replaced image selected from among predetermined images, based on the type of the first image, and control the display to display the first replaced image corresponding to the first image as the replaced image.

According to various embodiments, the processor may be configured to determine to display a second replaced image in which at least one first area corresponding to at least a portion of the at least one security object is modulated in the first image as the replaced image.

According to various embodiments, the processor may be configured to control the display to display the second replaced image by displaying at least one modulation object produced based on the at least one security object on the at least one first area corresponding to at least the portion of the at least one security object.

According to various embodiments, the processor may be configured to control the display to display, based on reception of a touch input onto the at least one modulated first area of the second replaced image, display a portion of the image on an area corresponding to the touch input and display a portion of the at least one modulation object on the remaining area, excluding the area corresponding to the touch input, among the at least one first area.

According to various embodiments, the processor may be further configured to identify state information of the electronic device and, based on the state information, determine whether or not to display the replaced image.

According to various embodiments, the processor may be configured to identify the state information, based on at least one of whether or not the electronic device is located in a specified place, whether or not the electronic device is connected to a specified network, or whether or not the electronic device senses a specified device.

According to various embodiments, the processor may be configured to determine, if the electronic device is not located in the specified place and is not connected to the specified network, to display a first replaced image selected from among images predetermined based on the type of the first image determined based on the at least one object, and determine, if the electronic device is located in the specified place and is not connected to the specified network, to display a second replaced image in which at least one first area corresponding to at least a portion of the at least one security object is modulated in the first image.

According to various embodiments, the processor may be further configured to identify a privacy level of the first image, based on the at least one object.

According to various embodiments, the processor may be further configured to perform an authentication procedure corresponding to the privacy level in response to a user input and, based on authentication according to the authentication procedure, control the display to stop displaying the replaced image and display the first image.

According to various embodiments, the electronic device of claim may further include a communication module 190, wherein the processor may be further configured to control the communication module to transmit, based on the fact that the privacy level is a first privacy level, a first authentication request signal, in response to the user input, to a first external device (e.g., the electronic device 102, the electronic device 104, or the server 108) associated with the at least one object included in the first image and receive a first authentication signal from the first external device.

According to various embodiments, the processor may be configured to perform the authentication procedure corresponding to the privacy level in response to the user input requesting execution of total authentication for at least one image having the same privacy level as the privacy level of the first image and control the display, based on authentication according to the authentication procedure, to stop displaying the replaced image corresponding to the first image and at least one replaced image corresponding to the at least one image, and display the first image and the at least one image.

According to various embodiments, the processor may be configured to identify the user input, based on a touch input to a predetermined authentication object displayed on the display.

According to various embodiments, a method of operating an electronic device 101 may include identifying a display request for a plurality of images including a first image, identifying at least one object included in the first image, determining, based on the case where the first image includes at least one security object, to display a replaced image determined based on the at least one object included in the first image, determining, based on the case where at least one other image that is distinct from the first image, among the plurality of images, does not include a security object, to display the at least one other image, and displaying the replaced image corresponding to the first image together with the at least one other image through a display (e.g., the display module 160) of the electronic device.

According to various embodiments, the determining to display the replaced image determined based on the at least one object included in the first image may include determining to display a first replaced image selected from among predetermined images, based on a type of the first image determined based on the at least one object included in the first image, and displaying the first replaced image corresponding to the first image as the replaced image.

According to various embodiments, in the method, the determining to display the replaced image determined based on the at least one object included in the first image may include determining to display a second replaced image in which at least one first area corresponding to at least a portion of the at least one security object is modulated in the first image as the replaced image.

According to various embodiments, the method may further include identifying state information of the electronic device and, based on the state information, determining whether or not to display the replaced image.

According to various embodiments, the method may further include identifying a privacy level of the first image, based on the at least one object included in the first image.

According to various embodiments, the method may further include performing an authentication procedure corresponding to the privacy level in response to a user input and, based on authentication according to the authentication procedure, stopping displaying the replaced image and displaying the first image.

According to various embodiments, the method may further include controlling a communication module 190 of the electronic device to transmit, based on the fact that the privacy level is a first privacy level, a first authentication request signal, in response to the user input, to a first external device (e.g., the electronic device 102, the electronic device 104, or the server 108) associated with the at least one object included in the first image and receive a first authentication signal from the first external device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
at least one processor; and
memory storing instructions,
wherein the instructions, when executed by the at least one processor individually or collectively, cause the electronic device to:
receive a display request for a plurality of images comprising a first image;
identify at least one object included in the first image;
based on the at least one object comprising at least one security object, determine, when the electronic device is not located in a specified place and is not connected to a specified network, a replaced image to replace the first image as an image among a plurality of predetermined images predetermined based on a type of the first image according to the at least one object;
determine, when the electronic device is located in the specified place and is not connected to the specified network, the replaced image as an image in which at least one first area corresponding to at least a portion of the at least one security object in the first image is modulated; and
control the display to display the replaced image in place of the first image together with at least one other image distinct from the first image, among the plurality of images, that does not include a security object.

2. The electronic device of claim 1, wherein to determine the replaced image, the instructions, when executed by the at least one processor individually or collectively, cause the electronic device to
determine the type of the first image, based on the at least one object included in the first image; and
determine the image from among the plurality of predetermined images, based on the type of the first image.

3. The electronic device of claim 1, wherein the instructions, when executed by the at least one processor individually or collectively, cause the electronic device to control the display to display the replaced image by displaying, on the at least one first area, at least one modulation object produced based on the at least one security object.

4. The electronic device of claim 3, wherein the instructions, when executed by the at least one processor individually or collectively, cause the electronic device to control the display to, based on reception of a touch input onto the at least one first area, display a portion of the first image on an area corresponding to the touch input and display a portion of the at least one modulation object on a remaining area, excluding the area corresponding to the touch input, among the at least one first area.

5. The electronic device of claim 1, wherein to display the replaced image, the instructions, when executed by the at least one processor individually or collectively, cause the electronic device to:
identify state information of the electronic device;
based on the state information indicating the electronic device is in a first state, control the display to display the replaced image corresponding to the first image together with the at least one other image; and
based on the state information indicating the electronic device is in a second state, control the display to display the first image together with the at least one other image.

6. The electronic device of claim 5, wherein the state information indicates at least one of whether or not the electronic device is located in the specified place, whether or not the electronic device is connected to the specified network, or whether or not the electronic device senses a specified device.

7. The electronic device of claim 6, wherein the state information indicates whether or not the electronic device is located in the specified place, whether or not the electronic device is connected to the specified network, and whether or not the electronic device senses the specified device.

8. The electronic device of claim 1, wherein the instructions, when executed by the at least one processor individually or collectively, cause the electronic device to identify a privacy level of the first image, based on the at least one object.

9. The electronic device of claim 8, wherein the instructions, when executed by the at least one processor individually or collectively, cause the electronic device to:
perform an authentication procedure corresponding to the privacy level based on a user input; and
control the display, based on an authentication according to the authentication procedure, to stop displaying the replaced image and display the first image.

10. The electronic device of claim 9, further comprising a communication module,
wherein the instructions, when executed by the at least one processor individually or collectively, cause the electronic device to control the communication module to transmit, based on the privacy level being a first privacy level, a first authentication request signal corresponding to the user input, to a first external device associated with the at least one object included in the first image, and receive a first authentication signal from the first external device.

11. The electronic device of claim 9, wherein the instructions, when executed by the at least one processor individually or collectively, cause the electronic device to:
perform the authentication procedure corresponding to the privacy level based on the user input requesting execution of total authentication for at least one image having a same privacy level as the privacy level of the first image; and control the display, based on the authentication according to the authentication procedure, to stop displaying the replaced image in place of the first image and at least one replaced image corresponding to the at least one image, and to display the first image and the at least one image.

12. The electronic device of claim 11, wherein the instructions, when executed by the at least one processor individually or collectively, cause the electronic device to identify the user input, based on a touch input to an authentication object displayed on the display.

13. A method of operating an electronic device, the method comprising:

identifying a display request for a plurality of images comprising a first image;

identifying at least one object included in the first image;

based on the at least one object comprising at least one security object, determine, when the electronic device is not located in a specified place and is not connected to a specified network, a replaced image to replace the first image as an image among a plurality of predetermined images predetermined based on a type of the first image according to the at least one object;

determine, when the electronic device is located in the specified place and is not connected to the specified network, the replaced image as an image in which at least one first area corresponding to at least a portion of the at least one security object in the first image is modulated; and displaying, through a display of the electronic device, the replaced image in place of the first image together with at least one other image distinct from the first image, among the plurality of images, that does not include a security object.

14. The method of claim 13, wherein determining the replaced image comprises:

determining the type of the first image, based on the at least one object included in the first image; and selecting an image from among the plurality of predetermined images, based on the type of the first image.

15. The method of claim 13, wherein displaying the replaced image comprises displaying, on the at least one first area, at least one modulation object produced based on the at least one security object.

16. The method of claim 15, further comprising, based on reception of a touch input onto the at least one first area, displaying a portion of the first image on an area corresponding to the touch input and displaying a portion of the at least one modulation object on a remaining area, excluding the area corresponding to the touch input, among the at least one first area.

17. The method of claim 13, further comprising identifying a privacy level of the first image, based on the at least one object.

18. The method of claim 17, further comprising:

performing an authentication procedure corresponding to the privacy level based on a user input; and based on an authentication according to the authentication procedure, stopping the displaying of the replaced image and displaying the first image.

* * * * *